US012598117B2

(12) United States Patent
Chittari et al.

(10) Patent No.: US 12,598,117 B2
(45) Date of Patent: Apr. 7, 2026

(54) METHODS AND SYSTEMS FOR IMPLEMENTING DYNAMIC-ACTION SYSTEMS IN REAL-TIME DATA STREAMS

(71) Applicant: LIVEPERSON, INC., New York, NY (US)

(72) Inventors: Ravi Chittari, New York, NY (US); Siddharth Bhaskar, New York, NY (US); Fady Massoud, New York, NY (US); Jason Farnsworth, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/525,523

(22) Filed: Nov. 30, 2023

(65) Prior Publication Data

US 2024/0187319 A1 Jun. 6, 2024

Related U.S. Application Data

(60) Provisional application No. 63/429,355, filed on Dec. 1, 2022.

(51) Int. Cl.
| | |
|---|---|
| *G06N 3/044* | (2023.01) |
| *G06N 3/045* | (2023.01) |
| *H04L 41/16* | (2022.01) |
| *H04L 41/5054* | (2022.01) |

(52) U.S. Cl.
CPC .......... *H04L 41/5054* (2013.01); *H04L 41/16* (2013.01)

(58) Field of Classification Search
CPC ............................ H04L 41/5054; H04L 41/16
See application file for complete search history.

(56) References Cited

U.S. PATENT DOCUMENTS

| | | | |
|---|---|---|---|
| 11,480,956 B2 | 10/2022 | Pritchard et al. | |
| 2017/0017901 A1 | 1/2017 | Firooz et al. | |
| 2019/0246989 A1* | 8/2019 | Genov ................... | A61B 5/374 |
| 2020/0364338 A1* | 11/2020 | Ducau ................... | G06F 21/564 |
| 2021/0081720 A1* | 3/2021 | Polleri ............... | G06F 18/2155 |
| 2021/0133670 A1* | 5/2021 | Cella ...................... | G06N 3/044 |
| 2021/0294818 A1* | 9/2021 | Savalle .............. | G06F 16/2477 |
| 2022/0197306 A1* | 6/2022 | Cella ............... | G05B 19/41865 |
| 2022/0329613 A1* | 10/2022 | Abbaszadeh ....... | H04L 63/1416 |

OTHER PUBLICATIONS

International Search Report and Written Opinion of Mar. 7, 2024 for PCT Application No. PCT/US2023/081939, 15 pages.

* cited by examiner

*Primary Examiner* — Brandon S Cole
(74) *Attorney, Agent, or Firm* — POLSINELLI LLP

(57) ABSTRACT

Systems and method are provided for implementing dynamic-action systems in real-time data streams. A computing device may generate a feature vector representing a portion of a real-time data stream. The computing device may execute a set of machine-learning models using the feature vector to generate a set of characteristics associated with the data stream. The computing device may determine that a condition of a trigger of a set of triggers is satisfied based on the set of characteristics. In response, execute a function associated with the trigger that is configured modify data that is to be transmitted over the data stream. The computing device may use another machine-learning model to monitor activation triggers and dynamically modify triggers to adjust the set of characteristics.

20 Claims, 7 Drawing Sheets

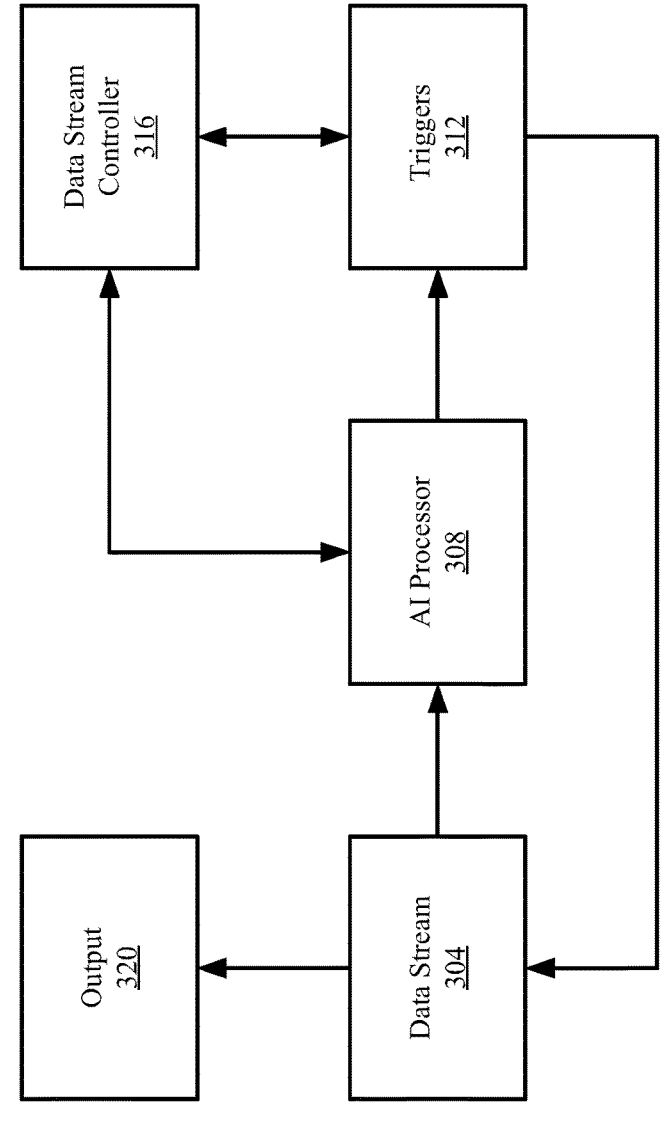
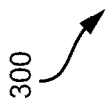
FIG. 3

600

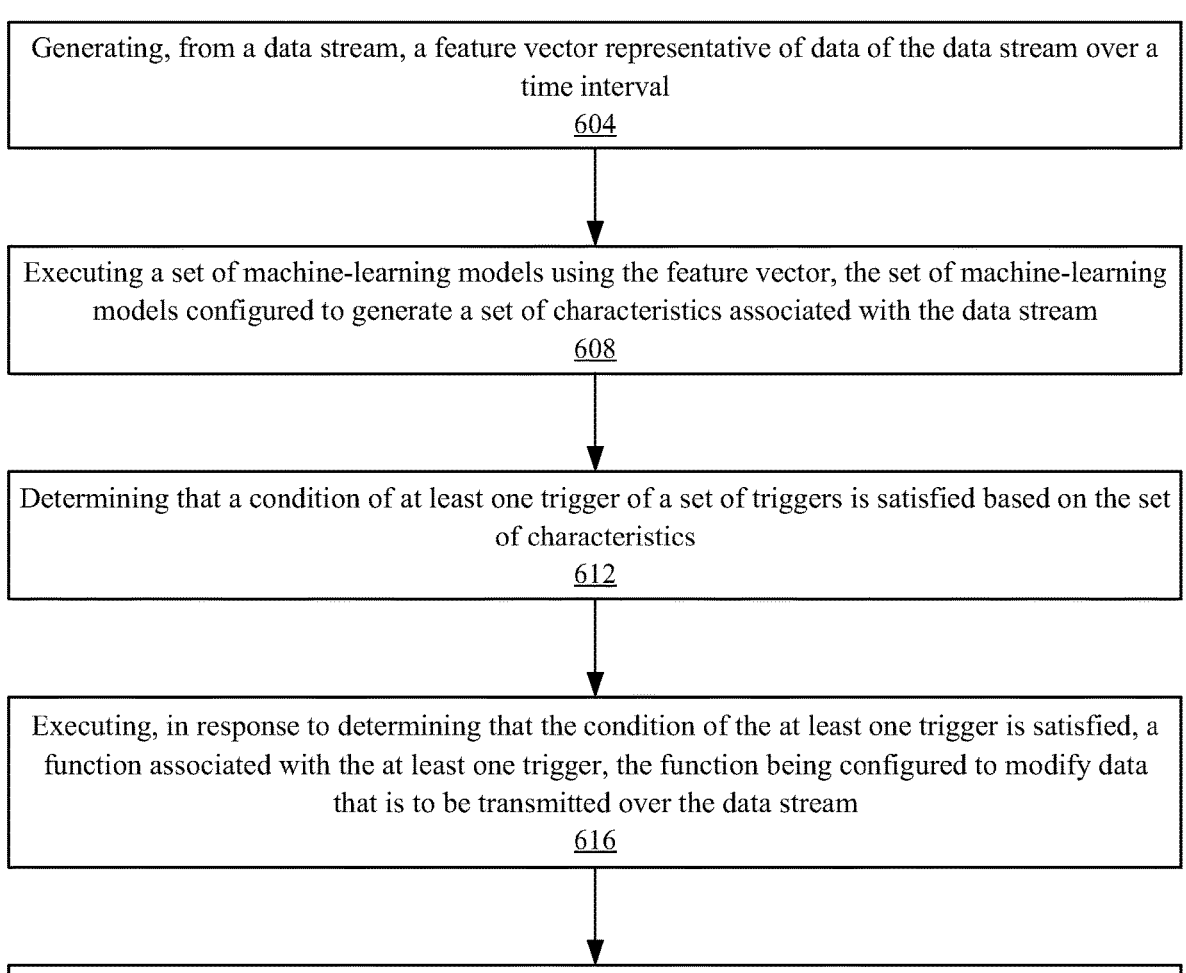

Generating, from a data stream, a feature vector representative of data of the data stream over a time interval
604

Executing a set of machine-learning models using the feature vector, the set of machine-learning models configured to generate a set of characteristics associated with the data stream
608

Determining that a condition of at least one trigger of a set of triggers is satisfied based on the set of characteristics
612

Executing, in response to determining that the condition of the at least one trigger is satisfied, a function associated with the at least one trigger, the function being configured to modify data that is to be transmitted over the data stream
616

Modifying, by a machine-learning model, the set of triggers based on the set of characteristics and the data stream to increase at least one characteristic of the set of characteristics
620

FIG. 6

METHODS AND SYSTEMS FOR IMPLEMENTING DYNAMIC-ACTION SYSTEMS IN REAL-TIME DATA STREAMS

CROSS REFERENCE TO RELATED APPLICATIONS

This patent application claims the priority benefit of U.S. provisional patent application No. 63/429,355 filed Dec. 1, 2022, the disclosures of which are incorporated by reference herein.

TECHNICAL FIELD

This disclosure relates generally to implementing a dynamic-action system, and more particularly to implementing dynamic-action systems that manage real-time data streams.

BACKGROUND

Enterprise systems operate across multiple domains to provide services to internal and external devices. These systems may receive and/or generate large quantities of data through routine operations. For instance, data may be received from externally connected devices (e.g., client devices, servers, other enterprise systems, etc.) and/or generated by one or more of the services provided by the enterprise system. Enterprise systems may store the data for potential future uses and/or delete the data to increase available storage capacity or processing resources. As those systems grow, new disparate devices types and/or data sources may be added. As a result, data received and/or generated by enterprise systems may be in differing and incompatible formats causing those systems to waste processing and/or storage resources or simple delete the data.

SUMMARY

Methods are described herein for implementing dynamic-action systems in real-time data streams. The methods may comprise: generating, from a data stream, a feature vector representative of data of the data stream over a time interval; executing a set of machine-learning models using the feature vector, the set of machine-learning models configured to generate a set of characteristics associated with the data stream; determining that a condition of at least one trigger of a set of triggers is satisfied based on the set of characteristics; executing, in response to determining that the condition of the at least one trigger is satisfied, a function associated with the at least one trigger, the function being configured to modify data that is to be transmitted over the data stream; and modifying, by a trigger machine-learning model, the set of triggers based on the set of characteristics and the data stream to increase at least one characteristic of the set of characteristics.

Systems are described herein for implementing dynamic-action systems in real-time data streams. The systems may include one or more processors and a non-transitory computer-readable medium storing instructions that, when executed by the one or more processors, cause the one or more processors to perform any of the methods as previously described.

The non-transitory computer-readable media described herein may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 depicts a block diagram of an example dynamic-action system configured to process and modify real-time data streams according to aspects of the present disclosure.

FIG. 6 illustrates a flowchart of an example process of a dynamic-action system configured to process and modify real-time data streams according to aspects of the present disclosure.

DETAILED DESCRIPTION

Figure 1:
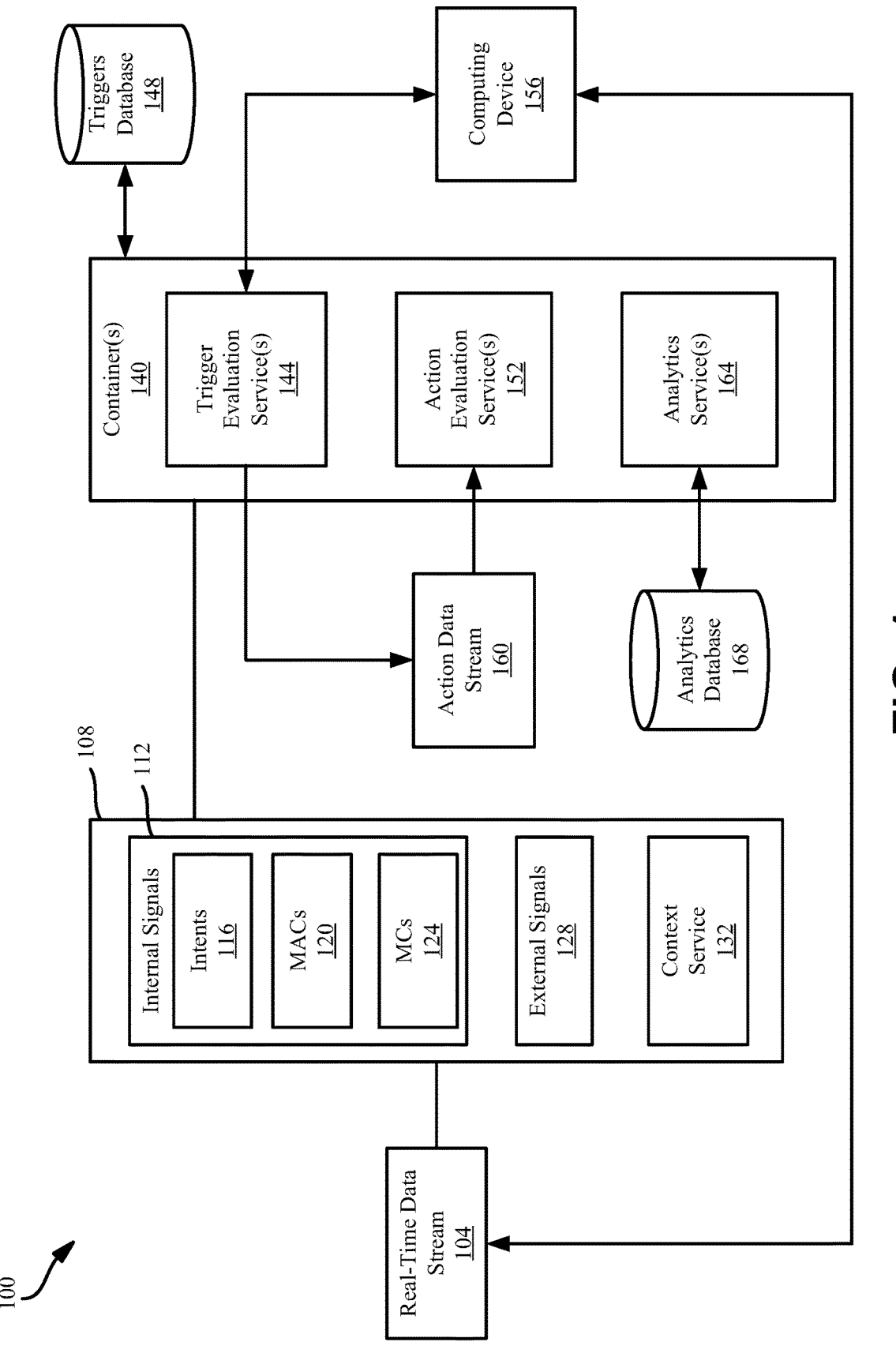
FIG. 1 depicts a block diagram of an example dynamic-action system configured to process data-streams in real-time according to aspects of the present disclosure.

The present disclosure includes systems and methods for a dynamic-action system configured to process real-time data streams. Processing systems (e.g., desktop/laptop computers, mobile devices, cloud networks, enterprise networks, etc.) may receive and generate large quantities of data to provide services to internal and external devices. The dynamic-action system may monitor real-time data streams of the processing system to dynamically define new functions, services, and/or the like in real-time. In addition, the dynamic-action system may include supervised and/or unsupervised learning processes to monitor and adjust the newly defined functions, services, etc. in real-time.

In some instances, a processing system generate data streams based on data received and/or generated from connections with internal or external devices. A data stream may include a representation of time-series data (e.g., a data vector, etc.) associated with a connection between the processing system and one or more devices in which the processing system and the one or more devices exchange data. The dynamic-action system may process the data stream in real time (e.g., as the data is being received, while the connection with the device is active, and/or while one or more services are being provided to the one or more devices) to modify a trajectory of the data stream. For example, the dynamic-action system can implement a new function in real-time that may improve a service currently being provided to the device by the processing system. Implementing the new function may cause subsequently transmitted data (e.g., by the processing device and/or the one or more devices) to be modified, which may adjust the course of the data stream. The dynamic-action system may continue to process the data stream to determine if further functions should be implemented to further improve the service being provided.

The dynamic-action system may include a set of machine-learning models, processes, algorithms, and/or the like configured to process the data stream in real-time. The machine-learning models included in the set of machine-learning models may be determined based on a type of connection maintained by the dynamic-action system, the one or more devices contributing to the data stream, users associated with the devices contributing to the data stream, and/or the like. For example, a voice connection (e.g., telephone or voice-over Internet Protocol connection between a device and the processing device) may include a machine-learning model configured to convert audio signals to text, a machine-learning model configured to parse or classify natural language text into machine-readable code, a machine-learning model to generate a score associated with a performance of the dynamic-action system, etc. The set of machine-learning models may include natural language parsers, speech-to text models, text-to-speech models, bots (e.g., automated service configured to simulate a human person in a conversation), intent classifiers (e.g., that determine an intent of the device connected to the dynamic-action system), other classifiers, combinations thereof, or the like that configured to define characteristics of the data stream.

The dynamic-action system may include a set of triggers that can be dynamically defined (in real-time) to enable or disable aspects of the dynamic-action system based on the characteristics generated by the set of machine-learning models. A trigger may include a condition that once satisfied, causes the dynamic-action system to perform an action. The trigger can be defined prior to establishing the connection with the device or during the connection with the device (e.g., dynamically). For example, during a voice connection with a device, a trigger may be defined to execute when an intent-based machine-learning model identifies a particular intent of the device (or a user thereof). The condition may be based on any property or generated characteristic (e.g., from the set of machine-learning models, etc.) of the data stream.

The action executed by a trigger may be predefined or defined in real-time. Examples of actions can include executing a function, modifying a function, accessing an interface such as application programming interface (API) or graphical user interface, defining or training new machine-learning models to process the data stream, alter a connection between the device and the processing device (e.g., connecting the device to a different device of the dynamic-action system such as one operated by a different user or one operated by a bot, connecting the device from a device operated by a bot to a device operated by a user, connecting the device from a device operated by a bot to a device operated by a different bot, etc.), providing a service to the device, providing a different service to the device, modifying a service being provided to the device, modify data to be provided to the device (e.g., based on data transmitted to the dynamic-action system), and/or or any other action associated with the properties and/or characteristics of the data stream.

The dynamic-action system may determine if a condition associated with a trigger of the set of triggers is satisfied based on the characteristics generated by the set of machine-learning models. In some instances, the dynamic-action system may determine if the condition of any trigger is satisfied, and if so, execute the action associated with each trigger having a condition that is satisfied. In other instances, the set of triggers may include a hierarchy. In those instances, the dynamic-action system may identify, from the triggers having a condition that is satisfied, the one or more triggers having a highest priority in the hierarchy. The dynamic-action system may then execute the actions associated with the one or more triggers having the highest priority in the hierarchy. The hierarchy of the triggers may be predefined, learned (e.g., from historical executions of the dynamic-action system, machine-learning, etc.), based on user input, or the like.

The dynamic-action system may continue to process the data stream to detect a response to the action executed by the trigger. The dynamic-action system may use the set of machine-learning models to generate a new set of characteristics of the data stream. In some instances, the dynamic-action system may weight the data of the data stream to favor processing newer data of the data stream over older data of the data stream (e.g., using overlapping or non-overlapping windows, etc.). By weighting the data, the dynamic-action system may cause the set of machine-learning models to generate new characteristics from the portion of the data stream modified as a result of the execution of an action. The dynamic-action system may then evaluate the effectiveness of the trigger in modifying the data stream by comparing the new characteristics to the previously generated characteristics. For example, if the action of the trigger caused a first device to be connected to an automated service, then the dynamic-action system may determine whether the automated service improved the data stream (e.g., addressed the intent of a user of the first device, etc.). The dynamic-action system may learn from the evaluation by modifying internal components of the dynamic-action system (e.g., trigger conditions, trigger actions, etc.) to further improve the data stream.

The dynamic-action system may use a machine-learning model trained to optimize one or more of the characteristics generated by the set of machine-learning models. The machine-learning model may use the previously generated characteristics and the new characteristics as input and output one or more modifications to the dynamic-action system that, when implemented, may further modify the data stream so as to cause one or more characteristics to be optimized. For example, the set of machine-learning models may generate a characteristic that corresponds to a score of a processing system in providing a service to a first device via a data stream. Upon executing an action associated with a first trigger causing a modification to the data stream (e.g., such as by executing a function that alters the service), the dynamic-action system may generate a new characteristic that corresponds to a new score of the processing system in providing the service to the first device. The dynamic-action system may then use the machine-learning model to modify the dynamic-action system to improve subsequent modifications to data streams implemented by the dynamic-action system.

Examples of modifications that may be performed to the dynamic-action system include, but are not limited to, modifying the set of machine-learning models (e.g., through retraining, adding new machine-learning models, removing machine-learning models, and/or the like), modifying triggers (e.g., such as but not limited to, adding new triggers, removing triggers, modifying conditions of a trigger, modifying an action of a trigger, etc.), combinations thereof, or the like. For example, the modification may adjust a condition of a trigger such that the condition is more likely to be satisfied. As a result, the dynamic-action system may be more likely to execute the action associated with this trigger.

FIG. 1 depicts a block diagram of an example dynamic-action system configured to process data-streams in real-time according to aspects of the present disclosure. Dynamic-action system 100 can be configured to process and/or modify data received from different sources. In some instances, dynamic-action system 100 may process real-time data streams (e.g., such as real-time data stream 104) in which data is being added continuously to a dataset by one or more sources. The data within a real-time data stream may be time-series data (e.g., each discrete datapoint generated by any or a combination of the one or more devices may be associated with a unique instant of time in which it was generated or injected into the data stream). For example, a communication between two devices (e.g., text, audio, audio/visual, etc.) may be represented as a real-time data stream in which data transmitted over the connection may be associated with a timestamp (e.g., relative to the data stream, dynamic-action system, a unix epoch or other epoch, etc.). In other instances, dynamic-action system 100 may process other real-time data, previously generated or received data, aggregated data, combinations thereof, or the like.

Dynamic-action system 100 may include one or more processing layers configured to process real-time data stream 104 (and/or other incoming data). For example, dynamic-action system 100 may include one or more data processors 108. Each data processor 108 may process a discrete portion of real-time data stream 104. In some instances, data processors 108 may be a hardware system including processing resources (e.g., processors, memories, etc.), a platform-as-a-service (PAAS), software (e.g., one or more machine-learning models, virtual machines, containers, applications, etc.), software-as-a-service (SAAS), combinations thereof, or the like.

One or more signals may be generated by data processors 108, received from user input, received from a remote device, and/or the like. A signal may include one or more data values corresponding to a discrete portion of real-time data stream 104. In some instances, the one or more data values may be based on a previous one or more data values (e.g., an immediately previous discrete portion of real-time data stream 104, discrete portions of real-time data stream 104 received before that, etc.) to further improve data processing. For example, if real-time data stream 104 is a voice connection between a first user and component of system 100 (e.g., an automated service such as a bot, a user, etc.), a first discrete portion of real-time data stream 104 may correspond to the portion of real-time data stream 104 between T=1 seconds and T=2 seconds. The data values received and/or generated during this discrete portion of real-time data stream 104 may be based on the data values received and/or generated from the previous discrete portion of real-time data stream 104 (e.g., the portion of the call between T=0 seconds and T=1 seconds). In a voice connection context, data processor 108 can process a current segment of the voice connection (e.g., a portion of a sentence spoken by the first user) with data of the previous segment of the voice connection processed by data processor 108 (e.g., an earlier portion of the same sentence).

The one or more data values of a signal may include, but are not limited to, new properties associated with real-time data stream 104, characterizations of real-time data stream 104, dimensionality-reduced data corresponding to real-time data stream 104, combinations thereof, or the like. Returning to the previous voice connection example, data processors 108 may continuously receive and/or generate the new data values from each discrete portion of real-time data stream 104 while the voice connection is maintained. In some instances, data processors 108 may dynamically define the size of each discrete portion of real-time data stream 104 (or of any incoming data stream), which may dictate a quantity of new data values generated for a particular data input. For example, data processors 108 may define a discrete segment as being 500 milliseconds of the incoming data, 1 second of the incoming data, or data over any time interval. Data processors 108 may increase or decrease the size of a discrete segment while incoming data is received to, for example, increase an accuracy of data processors 108, increase a processing efficiency of data processors 108 (e.g., balancing a processor, memory, network bandwidth use needed to process the incoming data), and/or the like. Increasing a size of a discrete segment may increase an accuracy or quality of data values received, generated, or derived from the discrete segment and decrease a resolution and/or quantity of the data values generated while the incoming data is received. Decreasing a size of a discrete segment may increase decrease an accuracy or quality of data values received, generated, or derived from the discrete segment and increase resolution and/or quantity of the data values generated while the incoming data is received. Data processors 104 may determine to increase or decrease the size of each discrete portion of real-time data stream 104 using a machine-learning model, a maximization/minimization algorithm, user input, combinations thereof, or the like.

Examples signals 112 that may be generated by data processors 108 include, but are not limited to, a predicted intent 116 of one or more users of the voice connection, a meaningful automated conversation score (MACS 120) (e.g., indicating a quality of an interaction between a user and an automated service such as bot configured to converse with the user), meaningful conversation score (MCS 124) (e.g., indicating a quality of an interaction between a user and an automated service such as bot configured to converse with the user), classifier output (e.g., output from a machine-learning classifier such as, but not limited to, a natural language-based classifier, etc.), standard data entity (e.g., Java Server Object Notation format data expected by an application programming interface), attributes corresponding to the incoming data (e.g., received or generated by the one or more users contributing to the incoming data, machine-learning models, software, combinations thereof, or the like), user input (e.g., from one or more of the users contributing to the incoming data, etc.), an indication of behaviors of users or automated services contributing to the incoming data (e.g., received or generated by the one or more users contributing to the incoming data, machine-learning models, software, combinations thereof, or the like), combinations thereof, or the like. Data processors 108 may receive external signals 128 from one or more remote devices. External signals 128 may be associated with real-time data stream 104 and/or the discrete portion of real-time data stream 104 that being processed by data processor 108 at a given time interval (e.g., such that external signals may be received at a same frequency as internal signals are generated). Alternatively, external signals 128 may be received at different frequencies such that the quantity of signals received may be greater than or less than the quantity signals generated by data processor 108 (e.g., internal signals 112).

Context service 132 may include data associated with services provided by data processors 108. Context service 132 may store an identification of real-time data stream 104, an identification of users contributing data to real-time data stream 104, an identification of automated services contributing data to real-time data stream 104, an identification of internal signals 112 and/or external signals 128, values of internal signals 112 and/or external signals 129 an indication of a disposition of real-time data stream 104 (e.g., an indication of how real-time data stream 104 terminates, if it terminates), combinations thereof, or the like. Context service 132 may be used to characterize an overall performance of data processor 108 or dynamic-action system 100.

Data processors 108 may output internal signals 112 and/or external signals 128 to one or more trigger systems 140. Each trigger system 140 may include one or more virtual machines, containers, execution environments, combinations thereof, or the like configured to execute actions based on internal signals 112 and/or external signals 128. The actions may be dynamically defined and/or preconfigured to modify the course of real-time data stream 104. Each trigger system 140 may include one or more trigger evaluation services 144. Trigger evaluation services 144 include a set of triggers, in which each trigger can include an activation label (e.g., indicating how the trigger is activated or deactivated), activation constraints (e.g., indicating the conditions that may occur to activate or deactivate a trigger), one or more conditions, and an executable event. In some instances, trigger evaluation services may receive the set of triggers from triggers database 148. Alternatively, or additionally, triggers may be received and/or defined from user input, a remote device, data processors 108, one or more machine-learning models, and/or the like.

Trigger evaluation services 144 may monitor internal signals 112 and/or external signals 128 received from data processors 108 to determine whether the conditions of a trigger have been satisfied. If so, trigger evaluation services 144 may execute the executable event. The executable event may be a call to a function or service (e.g., causing the function or service to execute), a remote procedure call, a function-as-a-service (FAAS), test case, combinations thereof, or the like. In some instances, the executable event may be a context switch, a rerouting of one or more connections to the real-time data stream 104, an initiation of a test phase (e.g., A/B testing, unit testing, execution of test cases, etc.), a termination of a test phase, a communication guide (e.g., content for a user to recite during a voice connection, content to be transmitted to real-time data stream 104 by a user or automated services contributing to real-time data stream 104).

Returning to the previous voice connection example, a first trigger may include a condition that is satisfied when the meaningful automation conversation score (MACS) (e.g., the value corresponding quality of an automated service that is conversing with a human user) is less than a threshold value (e.g., indicating that quality of the automated service is low). Trigger evaluation service 144 may monitor the MACS signal from data processors 108 to determine if the condition of the first trigger is satisfied. If so, trigger evaluation service 144 may execute the executable event causing, for example, the user to be connected to a different automated service or to user instead of the automated service. Trigger evaluation service 144 may continue to monitor the MACS signal from data processors 108 to determine if the condition of the first trigger (or another trigger) is satisfied in which case the executable event of the first trigger (or the other trigger) may be executed.

Trigger evaluation service 144 may operate as long as signals are being received from data processors 108 (e.g., which may be as long as real-time data stream 104 is being received by data processors 108). In some instances, in addition to continuously monitoring signals from data processors 108, trigger evaluation services 144 may refine aspects of the set of triggers to improve operation of the dynamic-action system 100. For instance, trigger evaluation system 144 may cause a executable event to execute upon detecting that the corresponding conditions have been satisfied. The execution of the corresponding action may result in action data stream 160 that is monitored by one or more action evaluation services 152.

Actions executed by the executable event may modify how data may be added to real-time data stream 104. Data of real-time data stream 104 that generated prior to execution of the action may not be affected. Examples of actions that may be executed to modify the course of real-time data stream 104 may include, but are not limited to, adding an additional device to real-time data stream 104 (e.g., such as a device operated by an automated service, a device operated by a user, etc.), rerouting a connection to real-time data stream 104 (e.g., connecting a device operated by an external user from an automated service of dynamic-system 100 to a different automated service of dynamic-system 100 or another system, from an automated service of dynamic-system 100 to a device operated by a user of dynamic-system 100 or another system, from device operated by a user of service of dynamic-system 100 to device operated by another user of dynamic-system 100 or another system, from device operated by a user of service of dynamic-system 100 to an automated service of dynamic-system 100 or another system, etc.), disconnecting a device from real-time data stream 104, suggesting data for a device and/or user of a device to add to real-time data stream 104 (e.g., suggesting data or a particular phrase to be provided by a user of a device or an automated service), adding data to real-time data stream 104 (e.g., such as a response to a query detected in real-time data stream 104, etc.), change context (e.g., changing a topic of conversation to a different topic to match a user or device intent or other signal, etc.), combinations thereof, or the like.

Triggers may be defined to be satisfied once per data stream, a predetermined quantity of times per data stream, or as frequently as the trigger conditions are satisfied by the data or signals of a data stream. The conditions of a trigger may be based on signals received from data processors 108, received from one or more internal or external devices, received from user input (e.g., an input from an external device connected to real-time data stream 104, input from a device of dynamic-action system 100 connected to real-time data stream 104, etc.), based on one or more other triggers (e.g., whether conditions of one or more other triggers were satisfied causing the corresponding action to be executed, etc.), combinations thereof, or the like. For instance, conditions of a first trigger may be satisfied when a signal from data processor 108 is greater than a threshold and an action of a second trigger was previously executed.

Action evaluation service 152 can determine an effect of the action on real-time data stream 104. The effect may be determined by monitoring internal signals 112 and/or external signals 128 received from data processor 108, from monitoring real-time data stream 104 directly, from user input, from input from an automated service connected or contributing to real-time data stream 104, a remote device, combinations thereof, or the like. If the effect is positive (e.g., an improvement to one or more of internal signals 112 and/or external signals 128, etc.), then trigger evaluation service (and/or a user, computing device 156, remote device, remote service, etc.) may modify the conditions of the trigger that executed to reduce conditions of the trigger, which may cause the conditions of that trigger to be satisfied more easily and the executable event to occur more frequently in this real-time data stream 104 and/or other real-time data streams. If the effect is negative, then trigger evaluation service may modify the conditions of the trigger that executed to increase conditions of the trigger, which may cause the conditions of that trigger to have a higher threshold to be satisfied and, subsequently, the executable event to occur less frequently in this real-time data stream 104 and/or other real-time data streams.

For example, real-time data stream 104 may represent data of a voice connection between a user and an automated service. Trigger evaluation services 144 may monitor a MACS signal to determine if a condition of a first trigger is satisfied. The conditions may be a MACS signal being less than 5 (where MACS signals may be anywhere from 0 to 10). If the conditions are satisfied, then an executable event of the first trigger may execute causing the user to be connected to another automated service. Action evaluation service 152 may continue to monitor the MACS signal from data processors 108 to determine if rerouting the voice connection improved the MACS score. If so, action evaluation service 152 may transmit a communication to trigger evaluation service 144 causing the threshold of the condition of the trigger to be increased from 5 to 5.5. As a result, the change may reduce the conditions needed for the executable event to occur, which may cause the executable event to occur more frequently.

In some instances, action evaluation service 152 (and/or a user, computing device 156, remote device, remote service, etc.) may modify the executable event and/or action of a trigger in addition to or in place of modifying the conditions of a trigger. Action evaluation service 152 may determine that the action caused by an executable event did not improve real-time data stream 104 (e.g., based on one or more of internal signals 112 and/or external signals 128 did not improve, user input, automated service input, remote device input, a machine-learning model, etc.). Returning to the previous example, action evaluation service 152 may determine that rerouting the voice connection to a different automated service did not improve the MACS signal. Action evaluation service 152 (and/or a user, computing device 156, remote device, remote service, etc.) may modify the executable event and/or the action. For example, action evaluation service 152 may modify the action to cause the user to be rerouted to a different automated service, such as one trained to satisfy a particular intent (e.g., based on intent signal 116) of the user.

Trigger evaluation service 144 and/or action evaluation service 152 may include hardware and/or software modules. In some instances, trigger evaluation service 144 and/or action evaluation service 152 may include one or more machine-learning models configured to optimize one or more of internal signals 112 and/or external signals 128. The machine-learning models may be trained using supervised learning, unsupervised learning, semi-supervised learning, transfer learning, or the like from historical real-time data streams, historical operations of dynamic-system 100, or the like. In some instances, the machine-learning models may be trained using manually or procedurally generated data (e.g., modeled from historical real-time data streams, historical operations of dynamic-system 100, etc.). In addition to supervised learning, unsupervised learning, semi-supervised learning, etc., the machine-learning models may be trained using reinforcement learning. In reinforcement learning, feedback from an execution of dynamic-action system 100 (e.g., a trigger being satisfied or not, an action being executed or not, etc.) may be used to reinforce an output from the machine-learning models to improve execution of the machine-learning models.

The machine-learning models may be statistical classifiers that predict an effect that an action (e.g., a trigger action, etc.) will have on signals of internal signals 112 and/or external signals 128. A machine-learning model may generate predictions of an effect of varying trigger conditions on internal signals 112 and/or external signals 128 and a probability corresponding to each prediction indicating the likelihood of that effect. For instance, the machine-learning model may output a probability distribution (e.g., based on a SoftMax normalization, or the like) indicating, for set of changes to trigger conditions, a predicted change to internal signals 112 and/or external signals 128. The machine-learning model or another machine-learning model trained to maximize or minimize signals may then determine if such a modification to the trigger condition should be implemented. The machine-learning model may also generate predictions of an effect of modifying executable events and/or actions on internal signals 112 and/or external signals 128 and a probability corresponding to the predictions.

Analytics service 164 may include one or more processes configured to monitor real-time data stream 104, trigger evaluation service 144, action evaluation service 152, data processors 108 (and any signals generate from data processors 108), computing device 156, and/or the like and generate analytics usable to characterize real-time data stream 104, the computing device 156, and/or the operations of dynamic-action system 100 associated with real-time data stream 104. The analytics may be stored in analytics database 168. In some examples, analytics of analytics database 168 maybe usable to train the various machine-learning models of dynamic-action system, automated service configured to interact with devices connected to subsequent real-time data streams, computing device 156 and/or (and/or an operator thereof). For example, features may be extracted from the analytics and from real-time data stream 104. Dynamic-action system 100 may generate a feature vector from the features for use in the training.

In other examples, the analytics may be used to verify the integrity and/or accuracy of trigger evaluation service 144 and/or action evaluation service 152. The analytics may indicate whether a trigger executes as defined (e.g., trigger executes upon detection of a defined event or signal, trigger executes at or below a predetermined frequency, executable event of the trigger executes within a predetermined time interval after execution of the trigger such as within milliseconds or seconds as defined, and/or the like), whether the executable event improved and/or worsened subsequently generated signals of data processor 108, and/or the like. The analytics may be usable during the real-time data stream (e.g., while devices are connected to and/or while data is being transmitted over the real-time data stream) and/or after the real-time data stream is terminated (e.g., once one or more devices disconnected from the real-time data stream, data is no longer being transmitted over the real-time data stream, the real-time data stream is terminated, etc.).

Figure 2:
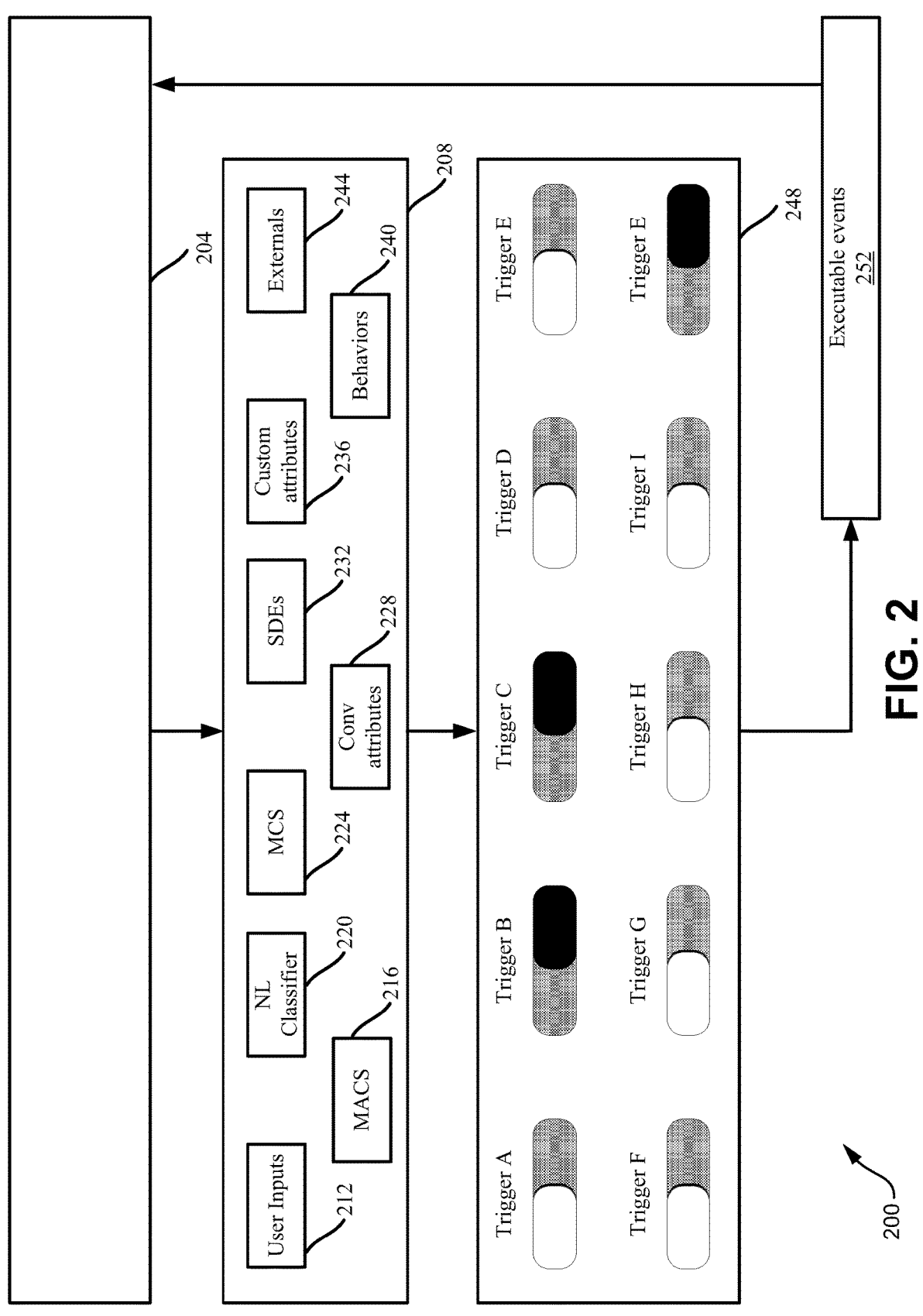
FIG. 2 illustrates a block diagram of an example dynamic-action system configured to process real-time voice communications according to aspects of the present disclosure.

FIG. 2 illustrates a block diagram of an example dynamic-action system 200 configured to process real-time voice communications according to aspects of the present disclosure. A voice connection may include voice communications transmitted over a connection between two or more devices. The voice connection may be represented as a data stream (e.g., data stream 204) in which data is represented as a function of time. Each device of the voice connection may transmit voice communications over the connection to be received by the other connected devices. In some examples, data stream 204 may represent a voice connection between a first device operated by a first user (e.g., that may be external to dynamic-action system 200) and a second device (e.g., that may be internal or external to dynamic-action system 200). The second device may be operated by another user, an automated service such as a bot, a data source (e.g., such as one or more sensors, the Internet, etc.). For example, the first device may be operated by a user calling a customer service subsystem of dynamic-action system 200.

Data stream 204 may be represented as an analog signal (e.g., as shown), as a digital signal, or as any other representation. For example, auditory signals may be received by the first device from, for example, the first user. The first device may transmit the auditory signals as analog signals over the voice connection (e.g., adding the analog signals to the data stream 204 representation). Data stream 204 may be represented as a stream of analog or digital signals. In some instances, an analog-to-digital converter and/or a digital-to-analog converter may be utilized to convert input and output signals into an expected format.

Data stream 204 may be a representation of other types of data transmitted between two or devices over a time interval (e.g., of a predetermined or indefinite length) such that each discrete data value may be associated with a time instant within the time interval. For example, a sensor platform in which one or more devices transmit sensor data over a connection with a computing device that processes the sensor data may be represented as a data stream in which each data value transmitted over the connection with the computing device is associated with the instant in time in which the data value was generated, derived, or transmitted.

Data stream 204 may be processed by data processor 208 (e.g., such as data processors 108 of FIG. 1), by a component (e.g., hardware or software) of dynamic-action system 200, by a distributed process (e.g., executing across two or more environments), or the like. Data processor 208 may sample data stream 204 in real-time and process the portion of data represented by each sample. A sample may correspond to the data of data stream 204 positioned within a time interval. Data processor 208 may use a sample size value and sample distance value to define the samples from data stream 204. The sample size value may be indicative of a size of the sample that is to be processed (e.g., a length of the time interval over which data from data stream 204 is to be included in a sample and processed). For example, the sample size value may be 1 second such that the sample may include data of data stream 204 within a 1 second time interval. The sample size value may be predetermined, dynamically defined at runtime (e.g., during processing of data stream 204 to optimize an accuracy of the signals generated by data processor 204 and/or processing resources consumed by data processor 208 to generate the signals), based on user input, based on signals generated by data processor 208, based on previous data streams, based on previous operations of dynamic-action system 200, combinations thereof, or the like.

The sample distance value may determine a quantity of samples that will be defined from data stream 204. The sample distance value may indicate a time interval between a start of a first sample and a start of a next sample. If the sample distance value is equal to the sample length value, then the entirety of data stream may be processed with non-overlapping samples. If the sample distance value is less than the sample length value, then the samples may overlap. For example, if the sample size value is set to 1 second and a sample distance value is set to 500 milliseconds, then a first sample may include data of data stream 204 from T=0 seconds to T=1 second and a second sample may include data of data stream 204 from T=. 5 seconds to T=1.5 seconds. If the sample distance value is greater than the sample length value, then the samples may not cover the entirety of data stream 204. For example, if the sample size value is set to 1 second and a sample distance value is set to 1.5 seconds, then a first sample may include data of data stream 204 from T=0 seconds to T=1 second and a second sample may include data of data stream 204 from T=1.5 seconds to T=2.5 seconds (e.g., such that data of data stream 204 between T=1.01 and T=1.49 may not be processed by data processor 208). The sample distance value may be predetermined, dynamically defined at runtime (e.g., during processing of data stream 204 to optimize an accuracy of the signals generated by data processor 204 and/or processing resources consumed by data processor 208 to generate the signals), based on user input, based on signals generated by data processor 208, based on previous data streams, based on previous operations of dynamic-action system 200, combinations thereof, or the like.

Data processor 208 may generate one or more signals from the data represented by each sample of data stream 204 continuously (e.g., in predetermined time intervals) and in real-time (e.g., as the data is received). The signals may be generated by a software or hardware component of data processor 208 including, but not limited to, machine-learning models, input interfaces, application programming interfaces, network interfaces, combinations thereof, or the like. Examples of signals generated by data processor 208 include, but are not limited to, user inputs 212 (e.g., received by a device contributing to data stream 204, a device monitoring data stream 204, a device associated with dynamic-action system 204, a device operated by a remote entity, or the like), MACS values 216, a natural language classifier 220 (e.g., a natural-language parser, a natural-language generator, a machine-learning model configured to predict an intent of the first user and/or second user from natural language input, combinations thereof, or the like), MCS values 224, attributes derived from a data stream 228 (e.g., a context of data stream 204, a predicted likelihood that one or more events may occur, an identification of the first user, an identification of the second and/or other users of the voice connection, an identification of the first device, an identification of the second device and/or other devices of the voice connection, timestamp, an indication of how the voice connection terminates if and when it terminates, etc.), one or more standard data entities (SDEs 232) (e.g., an object expected by an application programming interface), custom attributes 236 (e.g., attributes received, generated, and/or derived from the particular data stream 204), behaviors 240 (e.g., received, generated, and/or derived from a machine-learning classifier configured to predict a current behavior of the first user and/or the second user), external signals 244 (e.g., received from one or more remote devices), combinations thereof, or the like.

In some instances, the signals may be generated by one or more machine-learning models trained using a historical data streams, manually generated data streams, procedurally generated data streams, and/or the like. For instance, natural-language classifier 220 may include one or more signals generated from a set of machine-learning models configured to generate predictions based on natural-language communications. Natural language classifier 220 may predict an intent of the first user (e.g., a goal of the first user in communicating with the second device) based on one or more of, words, phrases, speech patterns, and/or sentences spoken by the first user; and intensity of the words, phrases, and/or sentences spoken by the first user; a volume of the words, phrases, and/or sentences spoken by the first user; combinations thereof; or the like. The one or more signals may include an identification of a set of intents that may apply to the current sample, the current sample and previous one or more previous samples, to the data stream up to the current sample, etc. and a set of corresponding probabilities indicative of a confidence of the accuracy of the set of intents. For example, the set of intents may include "return a product", "check a balance", "speak to a representative", etc., with corresponding probabilities of 0.8, 0.3, 7, etc.

The one or more machine-learning models may be of varying types based on the signal configured to be output from a respective model. For instance, the set of machine-learning models of natural-language classifier 220 may include recurrent neural networks (e.g., long-short term memory, gated recurrent network, bi-directional recurrent neural networks, continuous-time recurrent neural network, transformers, deep learning networks, combinations thereof, or the like). These one or more machine-learning models may be trained using supervised learning, unsupervised learning, semi-supervised learning, reinforcement learning, connectionist temporal classification, and/or the like. Other machine-learning models may be of other types such as, but not limited to, concurrent neural networks, support vector machines, regression-based classifiers, clustering-based classifiers, etc. and/or trained according to other methods.

The signals generated by data processor 208 may be output to trigger block 248. Trigger block 248 may include a set of triggers. Each trigger can include an activation label, one or more activation constraints that determine the activation and/or deactivation of the trigger, one or more conditions, and an executable event that may be executed when the one or more conditions of the trigger have been satisfied. For example, trigger block 248 may receive one or more signals from data processor 208. Trigger block 248 may then determine that the conditions of Trigger A are satisfied and that Trigger A is active. Trigger A may then cause the executable event to be executed. The executable event may be executed directly (e.g., by the trigger with the satisfied conditions) or indirectly (e.g., by dynamic-action system 200, an external system or device, etc.).

Dynamic-action system 200 may control the triggers of trigger block 248 by defining and/or modifying the activation label and/or activation constraints of the triggers. Examples of activation labels may include, but are not limited to: inactive (e.g., indicating that the trigger may not cause or may prevent the execution of an executable event of the trigger even when the conditions of the trigger are satisfied), active (e.g., the trigger may cause the execution of the executable event in response to the conditions of the trigger be satisfied), phase-in (e.g., indicating that the trigger is initially limited, but may become fully activated over time), limited (e.g., indicating that the executable event of a trigger may be executed less frequently then the conditions of that trigger are satisfied by a threshold amount), dynamic (e.g., indicating that the executable event of a trigger may be executed based on the conditions of the trigger and the state of dynamic-action system 200, data stream 204, and/or other input), monitor (e.g., indicating that each instance in which conditions of a trigger are satisfied may be stored with or without the execution of the corresponding executable event), or the like. The activation label may be configured for each trigger based on predefined rules, user input, data stream 204, one or more signals from data processor 208, combinations thereof, or the like. For example, activation label may be defined based on user input setting the trigger as active, inactive, etc. or setting the properties of a particular activation constraint (e.g., such as phase-in properties, dynamic properties, etc.).

Activation constraints may include activation frequency thresholds, activation quantity thresholds, minimum activation thresholds, a combination thereof, or the like. An activation frequency threshold may correspond to a maximum frequency in which the conditions of a trigger can be satisfied during a data stream. The activation frequency threshold may be used by dynamic-action system 200 to prevent a trigger from causing the corresponding executable event from executing too frequently. For example, once a trigger executes two times in a ten-minute time interval, dynamic-action system 200 may deactivate the trigger for a predetermined time interval, for the remainder of data stream 204, etc. An activation quantity threshold may correspond to a maximum quantity of instances in which the conditions of a trigger can be satisfied during a data stream (e.g., regardless of the time interval over which those instances occur). Minimum activation thresholds may correspond to a threshold associated with the conditions that may be satisfied for a trigger, condition of a trigger, or executable event to be activated. For example, dynamic-action system 200 may define a minimum activation threshold for a trigger indicating a minimum frequency in which the conditions of the trigger are to be satisfied before the trigger can be set from inactive to active.

One or more actions may be defined for execution in response to a threshold of an activation constraint (e.g., activation frequency threshold, activation quantity threshold, minimum activation thresholds, etc.) being satisfied. The actions may be defined by dynamic-action system 200, a machine-learning model of dynamic-action system 200, user input, combinations thereof, or the like. The one or more actions can include, but are not limited to, deactivating a trigger (e.g., such as a trigger having conditions that are satisfied to frequently or to many times by a same data stream, etc.), activating a trigger (e.g., such as in response the conditions of that trigger being satisfied more than the minimum activation threshold, etc.), activating one or more other triggers (e.g., such as in response to the conditions of a first trigger being satisfied too frequently or too many times, etc.), connecting a different user to data stream 204 (e.g., such as an agent, or the like), connecting a different automated service or device to data stream 204, executing a function call (e.g., at the user device, dynamic-action system 200, agent device, a remote device, or the like), transmitting a communication, establishing a connection with an external device or service, combinations thereof, or the like.

In some examples, dynamic-action system 200 may set the activation label for new triggers as phase-in. The phase-in activation label may limit the activation of the trigger until dynamic-action system 200 can identify an effect of the new trigger on dynamic-action system 200. The phase-in activation label may begin with dynamic-action system 200 monitoring the conditions of the new trigger to determine a frequency with which the conditions of the new trigger are satisfied. Dynamic-action system 200 may monitor the conditions of the new trigger over a predetermined time interval of data stream 204, over one or more data streams, from historical data streams, or the like. Dynamic-action system 200 may then define activation constraints for the trigger such as an activation frequency threshold based on the observed frequency with which the conditions of the new trigger are satisfied. Alternatively, or additionally, the activation constraint may include an activation quantity threshold based on the observed frequency with which the conditions of the new trigger are satisfied. The activation frequency threshold may prevent instances in which the conditions of the new trigger are satisfied too frequently by a particular data stream causing the correspond executable event to be executed too frequently.

Dynamic-action system 200 may then define a phase-in rate that indicates the rate in which the new trigger will be phased in. The activation frequency threshold (or activation quantity threshold) and phase-in rate may be used to define a limit threshold, which may be a percentage of the activation frequency threshold (or activation quantity threshold). The limit threshold may be progressively increased according to the phase-in rate until it equals the activation frequency threshold (or activation quantity threshold, or other activation constraints defined for this phase-in).

The phase-in of the new trigger may proceed by activating the new trigger and monitoring the conditions of the trigger and the limit threshold. When the frequency (or quantity of instances) in which the conditions of the new trigger are satisfied is greater than the limit threshold during a particular data stream, the new trigger may be deactivated. Upon termination of the data stream, dynamic-action system 200 may determine an effect of the new trigger on dynamic-action system 200 (e.g., such as determining whether the executable event of the new trigger increased or decreased a particular signal from data processor 208, increased a result of dynamic-action system 200, etc.). If the analysis indicates that the executable event did not negatively impact dynamic-action system 200, then the limit threshold may be incremented according to the phase-in rate and the new trigger may be activated for the next data stream. When the frequency (or quantity of instances) in which the conditions of the new trigger are satisfied is greater than the incremented limit threshold during the next data stream, the new trigger may be deactivated again. After the next data stream, dynamic-action system 200 may determine an effect of the new trigger on dynamic-action system 200 and increment the limit threshold again (if no negative impact is detected). The phase-in process may continue until an optimal limit threshold is determined (e.g., based on the analysis, user input, a combination thereof, or the like) or the limit threshold is equal to the activation frequency threshold (or activation quantity threshold).

In some examples, dynamic-action system 200 may include a graphical user interface that can be presented by a display device. The graphical user interface may include a representation of the triggers of trigger block. The representation of each trigger may include an identification of the trigger, an indication as to whether that trigger block is active or inactive, an identification of the activation constraints of the trigger, an identification of an activation label of the trigger, combinations thereof, or the like. For example, as shown in FIG. 2, each trigger may be represented with an identification of the trigger (e.g., "Trigger A", Trigger B, etc.) and a toggle switch indicating whether the trigger is active or inactive. As shown Trigger B, Trigger C, and Trigger E are inactive and the remaining triggers are active. The selection of the toggle switch of a trigger may switch the trigger from one state (e.g., active) to another state (e.g., inactive). In some instances, other graphical elements may be used to represent the state of trigger and/or to change the state (e.g., such as a check box, button, etc.). The activation constraints of a trigger may be represented by similar graphical elements that indicate the state or value of the activation constraint and/or provide a mechanism to change the state or value of the activation constraint. The trigger state, activation constraint state, and/or activation constraint value can be changed in real-time while data stream 204 is being processed by dynamic-action system 200.

When the conditions of a trigger are satisfied, the trigger may cause the corresponding executable event to execute. In some instances, the causing the executable event to execute may include outputting a signal to executable events 252. The signal may include an identification of the trigger and/or the executable event. Executable events 252 may then identify the particular executable event and execute it. In some instances, the executable event may be located in one or more devices. For example, an executable event may cause an agent device to connect to data stream 204. In those instances, the trigger may transmit the signal to the one or more remote devices for execution by the one or more remote devices. Alternatively, trigger may cause executable events 252 or other component of dynamic-action system 200 to transmit the signal to the one or more remote devices.

Executable events may include, but are not limited to, a function (e.g., such as a, but not limited to a local function, remote function via a remote procedure call, a function as a service (FAAS), etc.), modifying a function, accessing an interface such as application programming interface (API) or graphical user interface, defining or training new machine-learning models to process data stream 204, altering connections to data stream 204 (e.g., connecting a new device to data stream 204, removing a device from data stream 204, etc.), providing a service to the first device of data stream 204, providing a different service to the first device, modifying a service being provided to the first device, modify data to be provided to the first device, a test case, combinations thereof, or any other action associated with the properties and/or characteristics of the data stream.

Upon execution of the executable event, dynamic-action system may determine an effect on data stream 204 and/or dynamic-action system 200. The effect may be determined based on feedback from the devices connected to data stream 204 (e.g., such as verbal or textual communications transmitted over data stream 204, etc.) and/or one or more signals from data processor 208. For example, dynamic-action system 200 may monitor changes in the MACS signal (e.g., representing a value associated with an interaction between a first device and an automated service) output from data processor 204. If the MACS signal decreases by more than a threshold amount, then dynamic-action system may determine that the executable event negatively impacted data stream 204.

In some instances, in response to determine that a signal has deviated by more than a threshold amount, dynamic-action system 200 may determine if the signal is correlated with the executable event. If the executable event is correlated with the signal, then dynamic-action system 200 may execute an action to mitigate further deviations in the signal and/or increase the signal. Dynamic-action system 200 may associate each trigger with one or more signals that the trigger may affect upon execution of the corresponding executable event. When an executable event executes, dynamic-action system 200 may attribute changes in correlated signals that occur within a predetermined interval from execution of the executable event to the executable event. Alternatively, dynamic-action system 200 may determine that any deviation in a signal output from data processor 208 that occurs within the predetermined time interval from execution of an executable event may be attributed to the executable event.

Dynamic-action system 200 may execute one or more processes in response to detecting a change in signals from data processor 208 and/or receiving feedback over data stream 204 from a connected device. The one or more processes may be configured to prevent further changes in one or more signals, to improve one or more signals, and/or the like. Examples of processors that may be executed include, but are not limited to, activating a trigger, deactivating a trigger, adding a new trigger, removing a trigger, modifying the conditions of a trigger (e.g., such that the conditions of the trigger may be satisfied more or less frequently), modifying an activation constraint of a trigger, transmitting a communication (e.g., over data stream 204, to the first device, an agent device, etc.), connecting and/or disconnecting a device from data stream 204 (e.g., replacing an automated service with a different automated service or an agent, etc.), transferring the data stream 204 to another service (e.g., connecting the first device to external device, etc.), and/or the like.

Alternatively, or additionally, the one or more processes may be defined and executed by a machine-learning model configured to manage an operating status of dynamic-action system 200. Dynamic-action system may define feature vector from one or more of the signals output from data processor 208 at time t, an identification of any trigger that have executed during a previous time interval ending at time t, an identification of data stream 204, an identification devices connected to data stream 204, an identification of users (if any) operating the identified devices, characteristics of the identified devices and/or users, combinations thereof, or the like. In some instances, the feature vector may also include an identification of one or more signals and one or more corresponding target signal values for the one or more signals. The one or more target signal values may include a discrete value or range of values of the one or more signals. The machine-learning model may receive the feature vector as input and output an identification of one or more modifications to trigger block 248 and/or any triggers therein that when implemented by dynamic-signal processor 200 may cause the signals output from data processor 208 to fall within the target signal values.

The machine-learning model may be trained using features extracted from historical data streams, dynamic-action system 200, and/or the like. In some instances, the features may be supplemented with additional training data such as manually generated training data, procedurally generated data, and/or the like. For example, the first few executions of dynamic-action system 200 may have little historical data to use to train the machine-learning model. Each time dynamic-action system 200 processes a data stream, the data generated from the by dynamic-action system 200 and from the data stream may be used to train the machine-learning model. Until there is sufficient data to train the machine-learning model, dynamic action system may use manually generated data, procedurally generated data, data from other dynamic-action systems 200 (e.g., such as systems processing similar types of data streams, having similar types of devices connected to those data streams, having a similar goal or purpose, and/or the like). Once dynamic-action system 200 has enough data, a new machine-learning model may be instantiated and trained using only the historical data from dynamic-action system 200.

The machine-learning model may monitor the effect of triggers on data stream 204. For example, an intent signal from data processor 208 may predict an intent of a first device connected to data stream 204. Upon detecting a query from the first device in data stream 204, an executable event of a first trigger may execute to inject a particular response to the query that is likely to satisfy the intent. The machine-learning model may process the signals output from data processor 208 after execution of the executable event to determine if the executable event improved satisfied the intent (e.g., as determined by changes in the intent signal from data processor 208). If so, then the machine-learning model may determine that no changes are needed to trigger block 248. If the machine-learning model detects a variation in the intent signal indicating that the intent is not satisfied, then the machine-learning model may output a modification to the first trigger and/or other triggers of trigger block 248. The modifications may include, but are not limited to, modifying the conditions that satisfy the trigger, the executable event, the activation constraints, the activation label, adding a new trigger, removing a trigger, deactivating a trigger, activating a trigger, combinations thereof, or the like.

The machine-learning model may be tuned to any of one or more signals of data processor 208 such that the machine-learning model may modify the trigger block 248 to cause a particular change in any of the one or more signals of data processor 208. For example, dynamic-action system 200 may select one or more signals and/or a target value (or range of values) for the selected one or more signals. Upon selection, an identification of the one or more signals and/or the target values (or range of values) may be input into the machine-learning model along with other input features. The selection of the one or more signals and/or a target value (or range of values) may be made at runtime and in real-time as dynamic-action system 200 is processing data stream 204 by modifying the feature vector that passed as input into the machine-learning during the next execution of the machine-learning model. The selection may also be changed at runtime and in real-time.

The machine-learning model may execute one or more times during data stream 204. In some instances, the machine-learning model may execute each time a trigger is implemented (e.g., the conditions of a trigger are satisfied, and the corresponding executable event is executed). In other instances, the machine-learning model may execute in predetermined time intervals (e.g., such as every 5 seconds, 15 seconds, etc.). In still yet other instances, the machine-learning model may execute upon detecting the occurrence of an event (e.g., such as, but not limited to user input, a signal from data processor 208 being greater than a first threshold or less than a second threshold, data of data stream 204 received from the first device or the second device, changes made to trigger block 248, combinations thereof, or the like). The machine-learning model be executed throughout the duration of data stream 204 to continuously adjust trigger block 248, which may in turn continuously adjust data stream 204 based on the signals from data processor 208.

In some instances, additional training may be performed on the machine-learning model based on feedback from the machine-learning model, the data processor 208, dynamic-action system 200, and/or user input. For example, reinforcement training may be performed. After implementing a modification to trigger block 248, dynamic-action system 200 may generate one or more training feature vectors from signals of data processor 208 to modify the machine-learning model based on whether the machine-learning model's modification improved the selected one or more signals (e.g., the new values of the selected one or more signals are closer to the target values then the initial values of the selected one or more signals. The reinforcement training may be performed any time after implementation of the modification to trigger block 248. In some instances, the reinforcement training may be executed at a predetermined time interval after implementation of the modification to trigger block 248. The predetermined time interval may be based on user input, output from the machine-learning model, dynamic-action system 200, the modification to the trigger block 248, combinations thereof, or the like. For example, the reinforcement training may be performed after implementation of the modification to trigger block 248 and after one or more executable events have been executed (e.g., such as those executable event corresponding to triggers modified by the modification to trigger block 248).

Dynamic-action system 200 may operate throughout the duration of data stream 200 (e.g., until data stream 204 is terminated and/or until no new data is being transmitted over data steam 200). Dynamic-action system 200 may extract features from the machine-learning model, trigger block 248, modifications made to trigger block 248, executable events executed, and/or the like that can be used to configure dynamic-action system 200 during management of subsequent data streams. Dynamic-action system 200 may be continuously adjusted during each data stream to improve future data streams.

FIG. 3 depicts a block diagram of an example dynamic-action system configured to process and modify real-time data streams according to aspects of the present disclosure. Dynamic-action system 300 may operate to control data stream 304 between a first device (e.g., operated by a user) and a second device (e.g., operated by an agent or automatized service associated with dynamic-action system 300). In some instances, data stream 304 may be a voice-based communication in which time-series data is transmitted between the first device and the second device. In other instances, data stream 304 may a time-series data set representing data transmitted between the first device and the second device (and optionally one or more additional devices).

AI processor 308 may include one or more machine-learning models configured to process data stream 304 and/or discrete portions thereof. AI processor 308 may output a set of signals representative that correspond to predicted characteristics of data stream 304, the first device, and/or a user of the first devices. Examples of signals generated by AI processor 308 include, but are not limited to, user input (e.g., received by a device contributing to data stream 304, a device monitoring data stream 304, a device associated with dynamic-action system 300, a device operated by a remote entity, or the like), MACS values, a natural language classifier (e.g., a natural-language parser, a natural-language generator, a machine-learning model configured to predict an intent of the first user and/or second user from natural language input, combinations thereof, or the like), MCS values, attributes derived from a data stream (e.g., a context of data stream 304, a predicted likelihood that one or more events may occur, an identification of the first user, an identification of the agent and/or other users of data stream 304, an identification of the first device, an identification of the second device and/or other devices of data stream 304, a timestamp, an indication of how data stream 304 terminates if and when it terminates, etc.), one or more SDEs (e.g., an object expected by an application programming interface), custom attributes (e.g., attributes received, generated, and/or derived from the particular data stream 304), behaviors (e.g., received, generated, and/or derived from a machine-learning classifier configured to predict a current behavior of the first user and/or the agent), external signals (e.g., received from one or more remote devices), combinations thereof, or the like.

AI processor 308 may output the set of signals synchronously (e.g., AI processor may generate each signal of the set of signals and output the set of signals at a same time instant) or asynchronously (e.g., AI processor 308 may output each signal of the set of signals as the signals are generated by AI processor 308) to triggers 312. Triggers 312 may include a set of triggers that may execute based on the set of signals. Each trigger may include one or more conditions and an executable event that may be executed upon the one or more conditions being satisfied. The executable event may modify the course of data stream 304 by, for example, injecting data, providing data to the second device for the second device to transmit over data steam 304 (e.g., such as a suggested communication, a response to a query, etc.), replacing the second device with a different device, replacing an automated service with a different automated service, routing the data stream 304 to an external device or system, connecting the data stream 304 to another agent (e.g., such as an agent with additional privileges, or an agent that can provide different services, etc.), executing a function (e.g., such as local function, remote procedure call, function-as-a-service, etc.), combinations thereof, and/or the like.

Triggers 312 may determine if the conditions of one or more triggers are satisfied based on the set of signals received from AIU processor 308. If the conditions of a trigger are satisfied, the trigger may cause the corresponding executable event to execute. For example, the executable event may be executed by dynamic-action system 300, by the trigger, by data stream controller 316, by a user, and/or the like. Executing the executable event may modify data stream 304 (as previously described). Triggers 312 may output an identification of each trigger having a corresponding executable event execute and a timestamp of the execution of the executable event to data stream controller 316.

Data stream controller 316 may manage the operations of dynamic-action system 300 by adjusting triggers 312. Data stream controller 316 may include a set of target signal values that correspond to the set of signals output from AI processor 308. Data stream controller 316 may receive the set of signals from AI processor 308 and determine a difference between the set of signals from AI processor 308 and the set of target signal values. Data stream controller 316 may then modify triggers 312 to reduce the difference between set of signals from AI processor 308 and the set of target signal values. The modification to triggers 312 may include adding new triggers, removing triggers, setting triggers to active or inactive, modifying the conditions of a trigger, modifying the executable event of a trigger, combinations thereof, or the like.

In some instances, data stream controller 316 may include a machine-learning model trained to predict modifications to triggers 312 that will reduce the difference between the set of signals from AI processor 308 and the set of target signal values. The machine-learning model may be configured to optimize one or more signals from the set of signals. Data stream controller 316 may receive the predicted modifications to triggers 312 and automatically implement the modifications. The machine-learning model may be executed one or more times over the course of data stream 304 (e.g., in set time intervals, in response to a detected event such as a trigger, and/or the like) to provide real time adjustment to triggers 312, which in turn provide real time adjustment of data stream 304.

The machine-learning model may receive, as input, a feature vector that includes features corresponding to or extracted from the current value of one or more signals from AI processor 308, historical values of the one or more signals from AI processor 308, target values for the one or more signals from AI processor 308, the current value of the set of signals from AI processor 308, an identification of triggers that have been implemented in a previous time interval, an identification of trigger that have been implemented from the initiation of data stream 204 to a current time, an identification of the set of triggers of triggers 312, an identification of the first device and/or the second device, an identification of the user of the first device and/or the agent of the second device, an identification of an automated service operating as the second device, an identification of historical data streams in which the first device and/or the second device were connected, characteristics of the historical data streams, combinations thereof, or the like.

Data stream controller 316 may select one or more signals from AI processor 308 that the machine-learning model is adjust and pass them to the machine-learning model as features for the feature vector. Data stream controller 316 may select different signals for each execution of the machine-learning model. For example, data stream controller 316 may select new signals as new machine-learning models are added to AI processor 308. Data stream controller 316 may use the signal selection to prioritize which signals are to be adjusted at a given time instant of data stream 304.

The machine-learning model may be trained over a training time interval using data from historical data streams, historical data from dynamic-action system 300 managing historical data streams, manually generated data, procedurally generated data (e.g., data generated by dynamic-action system 300, etc.), combinations thereof, or the like. The training time interval may be based on an accuracy metric of the machine-learning model. In some instances, the machine-learning model may be trained in parallel with the operations of dynamic-action system 200. In those instances, each time dynamic-action system 200 manages a data steam, the data stream and data generated by dynamic-action system 200 (e.g., including data corresponding to manual modifications to triggers 312 and/or modifications to triggers 312 made by data stream controller 316 during the data stream) may be used to define a training dataset to train the machine-learning model. The machine-learning model may be trained with multiple training datasets until an accuracy metric of the machine-learning model is greater than a threshold value. Once trained, data stream controller 316 may use the machine-learning model to automatically manage triggers 312 and data stream 304.

Data stream 304 may terminate upon the first device and/or the second device disconnecting from data stream 304. Dynamic-action system 300 may generate an output indicative of whether an intent of data stream 304 was satisfied. For example, a first device initiate data stream 304 by establishing a voice connection with a second device. The first device may transmit an identification of an intent (e.g., such technical support to correct a system fault, etc.). Alternatively, AI processor 308 may predict an intent of the first device (e.g., using artificial intelligence and/or machine learning as previously described). At the end of data stream 304, the second device and/or dynamic-action system 300 may request a termination condition that includes an indication as to whether the intent has been satisfied (e.g., such as verbal indication that system fault has been corrected). Alternatively, AI processor 308 may predict the termination condition based on data stream 304. Dynamic-action system 300 may then generate output 320 that includes an indication of the intent of the first device and the termination condition. Output 320 may also include characteristics of data stream 304 capture by and/or derived by dynamic-action system 300 such as, but not limited to, AI processor 308, triggers 312, data stream controller 316, combinations thereof, or the like. Output 320 may be used to define training datasets of machine-learning models, to execute a reinforcement learning iteration, update AI processor 308, modify one or more triggers of trigger 312 (e.g., add new triggers, remove triggers, modify conditions of a trigger, modify executable events, activate a trigger, deactivate a trigger, change activation labels or constraints, update data stream controller 316, combinations thereof, or the like.

Figure 4:
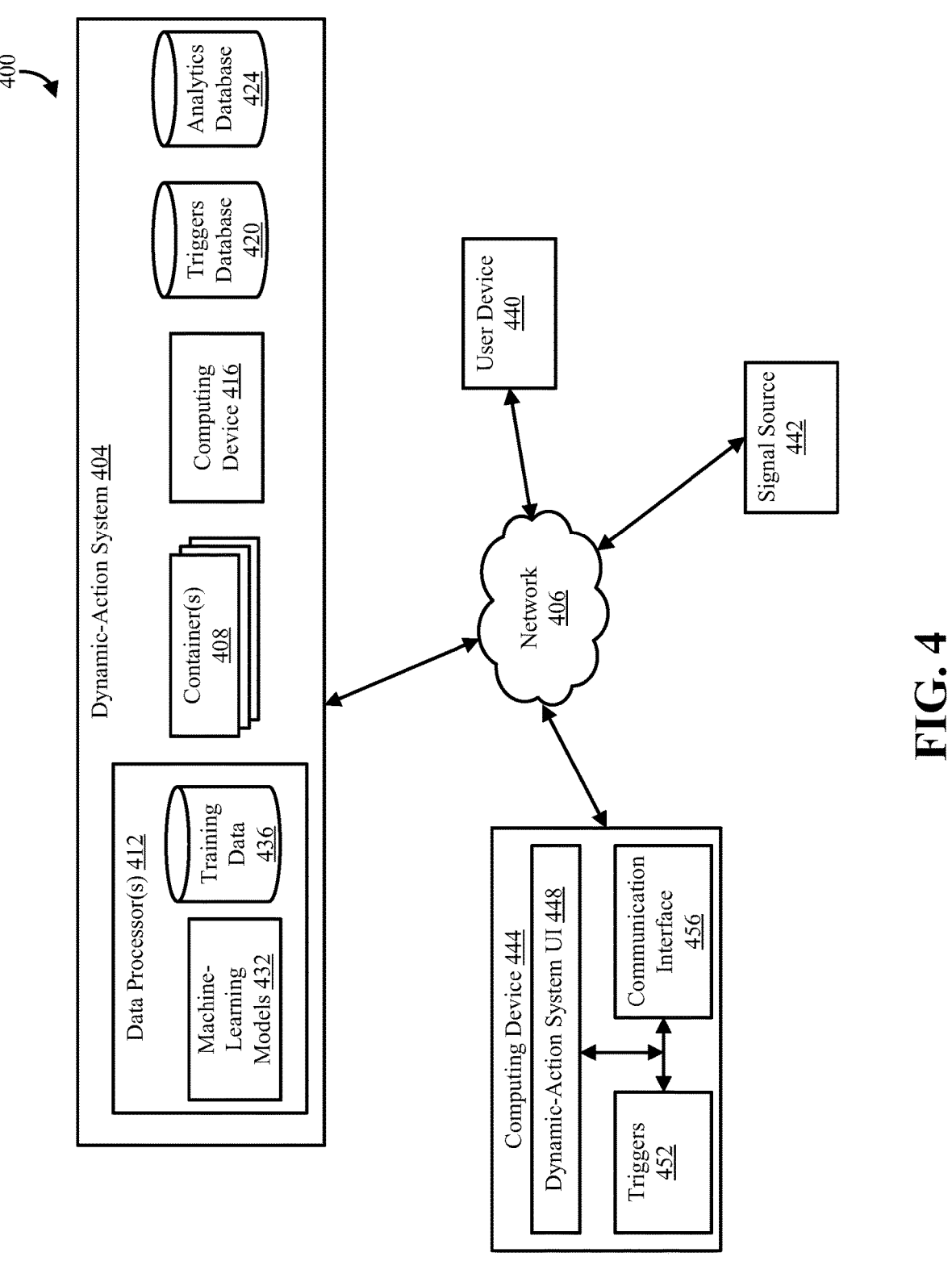
FIG. 4 illustrates a block diagram of an example special-purpose system implementation of a dynamic-action system configured to process real-time voice communications according to aspects of the present disclosure.

FIG. 4 illustrates a block diagram of an example special-purpose system implementation of a dynamic-action system configured to process real-time voice communications according to aspects of the present disclosure. Special-purpose system implementation of a dynamic-action system 400 may include one or more devices connected that operate individually or as a distributed processing network to perform the present disclosure. The one or more devices may include a hardware architecture and/or a software architecture designed to optimize performance of aspects of the present disclosure. Special-purpose system implementation of a dynamic-action system 400 may include a dynamic-action system 404 and computing device 444. Computing device 444 may be directly connected to dynamic-action system 404 or connected via network 406. In some examples, special-purpose system implementation of a dynamic-action system 400 may also include signal source 442 (e.g., external signals 128) and/or user device 440 (e.g., which may be associated with the data stream), which may be connected to dynamic action system 404 through network 406.

Dynamic-action system 404 may include one or more distributed devices configured to process data streams. The one or more distributed devices may be controlled by a load balancer that may add and/or remove devices from the one or more distributed devices to maintain a quantity of available processing resources. By keeping a quantity of available processing resources in reserve, dynamic-action system 404 may instantiate new containers 408 to processing new data streams with minimal delay allowing for real time or near real time processing live data streams. The load balancer may monitor containers 408 as well as the one or more devices and dynamically assign additional processing resources (e.g., new containers and/or devices) when the load is greater than a threshold. The threshold may be dynamically defined to avoid over allocation of additional processing resources. For example, the threshold may be defined based on a quantity of instantiated containers of containers 408 or a quantity of devices of the one or more devices. Alternatively, or additionally, the load balancer may dynamically define the quantity of additional processing resources to allocated to dynamic-action system 404 when the threshold is exceeded. For example, the first time the threshold is exceeded, the load balancer may double the quantity of processing resources allocated to dynamic-action system 404 and the second time the threshold is exceeded, the load balancer may allocate fewer additional processing resources (e.g., such a 75% of the current quantity of processing resources, etc.).

Dynamic-action system 404 may include a security component configured to secure processing of sensitive data streams. The security component may allocate processing resources separately from the load balancer to ensure that processing resources allocated to process sensitive data streams may be allocated isolated processing resources. Containers 408 includes containers that are already isolated environments that facilitate processing data streams, by further isolating the hardware architecture that operate containers, dynamic-action system 404 may prevent cross-contamination of data (e.g., which can occur when two or more containers utilize the same physical memory). A data stream may be flagged as sensitive by a user or agent connected to the data stream. In some instances, a data stream may be flagged as sensitive based on a signal generated from the data stream such when a particular intent of the user is predicted or when a particular word or phrase is detected from the user (e.g., as determined from a natural language processor, etc.).

For example, a data stream may be processed by a first container operating on a first device, which may operate one or more other containers processing other data streams. Once the data stream is flagged as sensitive, the security component may isolate the container processing the data stream to a single device. The isolation process may use a make-before-break operation to prevent an interruption of the processing of the data stream. In some examples, the make-before-break operation may include instantiating a second container on a second device, processing the data stream via the second container of the second device in parallel with the first container of the first device, and terminating the first container of the first device. In some instances, memory of the first device may be zeroed before instantiating additional containers that may access the same address space as the first container. In other examples, the other containers operating on the first device may be terminated and allocated to other devices. In those examples, containers may be instantiated on other devices in a make-before-break operations to prevent an interruption in the processing of the data streams being processed by those containers. The device operating the now isolated container may be prevented from instantiating additional containers for other data streams until the isolated container is terminated. In some instances, the security component may also isolate one or more data processors 412 configured to process the data stream and generate the internal signals to prevent data contamination and/or introducing a bias into the machine-learning models. Data processors 412 may be operate from the particular device operating the isolated container, from a third device, or as a distributed process across the particular device and the third device. When operating from the third device, the third device may be prevented from executing other data processors 412 or containers.

Dynamic-action system 404 may include computing device 416, triggers database 420 (e.g., triggers database 148, etc.), analytic database 424 (e.g., analytics database 168 of FIG. 1, etc.), and data processors 412 (e.g., data processors 108 of FIG. 1, etc.). Computing device 416 may include a processing device configured to manage the operations of dynamic-action system 404 from within dynamic-action system 404. In some instances, computing device 416 may be operated by an agent that connects to data streams. Computing device 416 may include the same or similar components as computing device 444. Data processors 412 may process data streams and generate signals that can be processed through containers 408 to execute triggers facilitating automated services. In some implementations, dynamic-action system 404 may include computing device 416 in implementations when computing device 444 is not present. Dynamic-action system 404 may also include any aspect of dynamic-action system 100 of FIG. 1. In some examples, dynamic action system may include one or more processors and memory configured to execute operations that provide the aspects of the present disclosure. The operations may include one or more management processes (e.g., thread scheduling, load balancing, security, etc.) that enable distributed processing of the operations among the one or more processors and/or devices. The management processes may segment the physical memory of dynamic-action system into discrete address spaces that can be allocated to containers 408. The management process may facilitate allocation of the discrete address spaces to particular containers of containers 408 and particular data processors of data processors 412.

In some instances, containers 408 and/or data processors 412 may be implemented as a software component that may be executed by the processing components of dynamic-action system 404 or computing device 416. In other instances, containers 408 and/or data processors 412 may be implemented as a hardware component such as an application-specific integrated circuit, field programmable gate array, mask programmable gate array, or as set of interconnected components (e.g., such as central processors, graphical processing units, memory, etc.), that operate in collaboration with the processing components of dynamic-action system 404. The hardware components may be isolated such that each hardware component may include a set of processing resources configured to execute the operations of a container and/or a data processor. The hardware components may include a thread scheduler that routes the processing of instructions between the hardware component and dynamic-action system based on the instructions to be executed, the load of the hardware component, security settings, etc. For instances, the hardware component may offload machine-learning processes to a graphics processing unit of dynamic-action system 404, which may more efficiently execute the processes and execute other processes internally. If a processing bottleneck occurs, the hardware component may adaptively route execution of processes to the processor of dynamic-action system 404 until the processing bottleneck is alleviated. In some instances, the hardware component may be designed to process instructions of a particular type. For instance, data processors 412 may operate one or more machine-learning models for generating signals from data streams. A data processor may include a version of a hardware component comprising a graphics processing unit with a large quantity of cores configured to process machine-learning tasks. Each hardware component may receive an identification of the processing capabilities of dynamic-action system 404 as well as an identification of other hardware components. Signals may be transmitted between hardware components to coordinate execution of instructions, avoid stalling the processors of dynamic-action system 404, race conditions, memory locks, etc.

Data processors 412 may include machine-learning models 432 and training data 436 to facilitate training of machine-learning models 432. Each data processor of data processors 412 may include a hardware component. Alternatively, data processors 412 may include software executed by a hardware component (e.g., within a container, etc.) or by dynamic-action system 404. Machine-learning models 432 may process data streams to generate signals. Triggers may execute various services in response to the signals output from data processor 412. Machine-learning models 432 may be trained using training data 436. Examples of machine-learning models include, but are not limited to neural networks (e.g., such as recurrent neural networks, mask recurrent neural networks, convolutional neural networks, faster convolutional neural networks, etc.), deep learning networks, you only look once (YOLO), deep learning networks, Naïve Bayes, random forest, regression models, transformers (e.g., language-based models), k-nearest neighbors, decision trees, generative adversarial networks (GANs), combinations thereof, or the like.

Computing device 444 may manage the processes of dynamic-action system 404 remotely. For instance, user device 440 may connect to communicate with an agent via an agent device. Computing device 444 may monitor the data stream, signals generated by data processors 412, executed triggers, analytics, etc. through dynamic-action system user interface 448. In some instances, computing device 444, dynamic-action system user interface 448, may define new triggers (e.g., triggers 452), remove triggers, modify triggers, adjust data processors 412 (e.g., such as types of signals generated, etc.), manage the data stream (e.g., terminate the data stream, add or remove devices connected to the data stream, etc.), combinations thereof, or the like. Computing device 444 may transmit communications via communication interface 456 and over network 406 to dynamic-action system 404. To execute the additions, removals, and/or modifications implemented by computing device 444.

Figure 5:
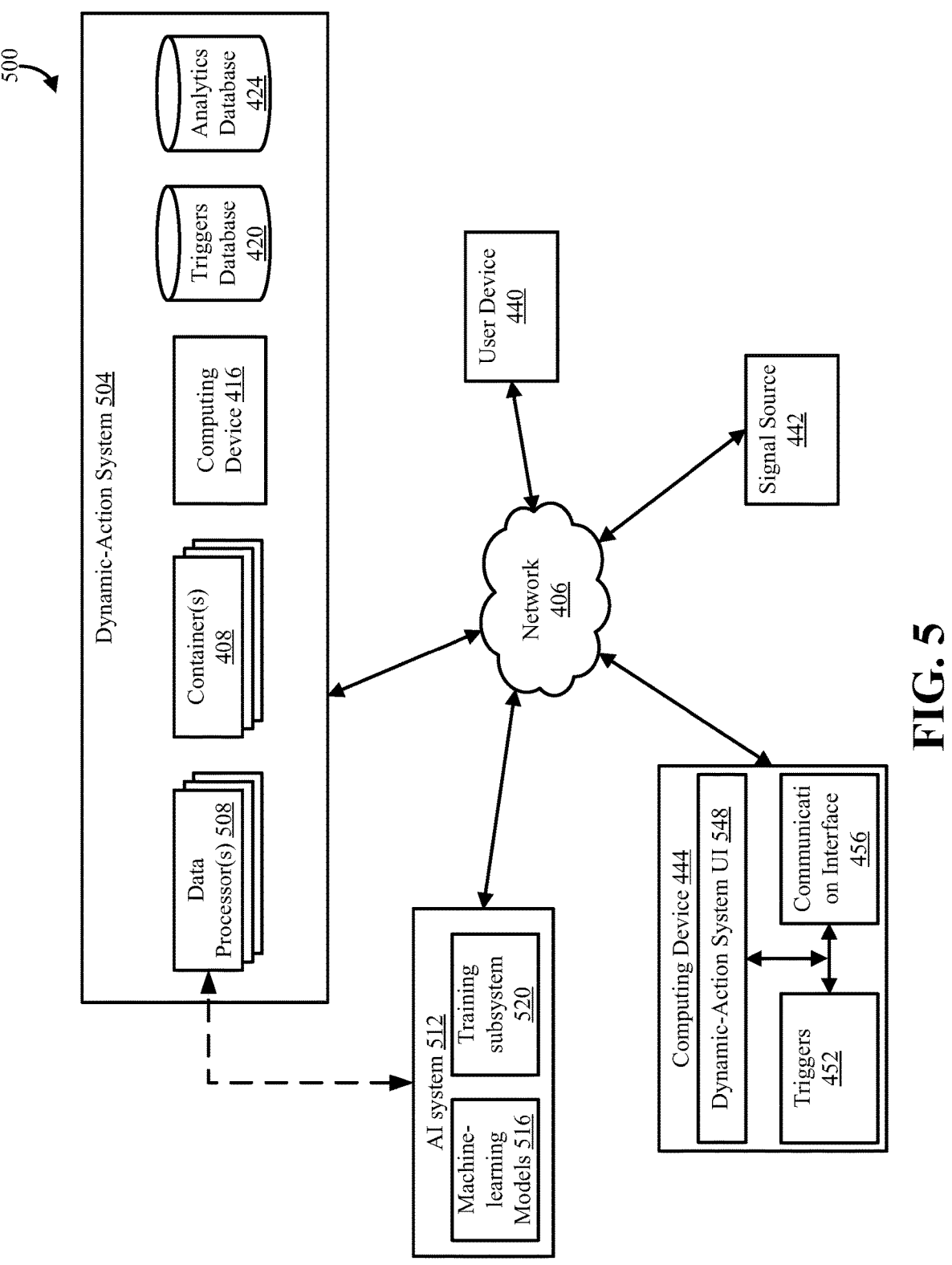
FIG. 5 illustrates a block diagram of an example distributed special-purpose system implementation of a dynamic-action system configured to process real-time voice communications according to aspects of the present disclosure.

FIG. 5 illustrates a block diagram of an example distributed special-purpose system implementation of a dynamic-action system configured to process real-time voice communications according to aspects of the present disclosure. Special-purpose system implementation of a dynamic-action system 500 may be an alternative implementation of special-purpose system implementation of a dynamic-action system 400 in which machine-learning models of data processors may be facilitated as a distributed process. Data processors 508 may process data streams and generate signals that can be processed through containers 408 to execute triggers facilitating automated services. Some data processing may be performed by data processors 508 through hardware (e.g., a hardware component) and/or as software. Other data processing may be facilitated by machine-learning models.

Data processors 508 may offload machine-learning processes to AI system 512. AI system 512 may be a separate processing device or network connected to dynamic action system 504 (e.g., via network 406 or via one or more direct links). AI system 512 may include processing hardware (e.g., one or more central processing units, memory, etc.) and software to facilitate training machine-learning models, preprocessing data from data streams, post processing data output from machine-learning models, communicating signals generated by machine-learning models, combinations thereof, or the like. Machine-learning models 516 may be trained by training subsystem 520 using supervised learning, unsupervised learning, semi-supervised learning, transfer learning, reinforcement learning, and/or the like. Machine-learning models 516 may be trained for a predetermined time interval, a predetermined quantity of iterations, and/or until one or more accuracy metrics are reached (e.g., such as, but not limited to, accuracy, precision, area under the curve, logarithmic loss, F1 score, mean absolute error, mean square error, or the like). Training subsystem 520 may monitor signals generated by Machine-learning models 516 to determine if a machine-learning model is to be retrained (e.g., reinforcement learning, additional training iterations, etc.) or if a new machine-learning model is to be instantiated and trained.

Examples of machine-learning models include, but are not limited to neural networks (e.g., such as recurrent neural networks, mask recurrent neural networks, convolutional neural networks, faster convolutional neural networks, etc.), deep learning networks, you only look once (YOLO), deep learning networks, Naïve Bayes, random forest, regression models, transformers (e.g., language-based models), k-nearest neighbors, decision trees, generative adversarial networks (GANs), combinations thereof, or the like.

AI system 512 may include one or more graphics processing unit with a predetermined quantity of cores configured to improve processing machine-learning tasks. The hardware architecture of AI system 512 efficiently processing machine-learning tasks at the expense of generic processing tasks. Data processors 508 may route processing tasks based on the type of processing tasks where machine-learning tasks may be routed to AI system 512 and non-machine-learning tasks may be processed by data processor 508 (e.g., the hardware component, etc.) or by a processor of dynamic-action system 504. AI system 512 may transmit signals generated by machine-learning models 516 to data processors 508. In some instances, AI system 512 may also transmit accuracy information such as confidence values, prediction probabilities, metadata, etc. that may qualify the signals. For example, dynamic-action system 504 may condition execution of one or more triggers on both the signal and the accuracy information.

FIG. 6 illustrates a flowchart of an example process of a dynamic-action system configured to process and modify real-time data streams according to aspects of the present disclosure. At block 604, a computing device generates a feature vector representative of data of the data stream over a time interval. The data stream may include any time-series data in which each discrete portion of data may be associated with a timestamp that corresponds to a moment in which the discrete portion of data was generated or added to the data stream. In some instances, the data stream may include a voice communication (e.g., such as phone call, etc.) between a first device operated by a user and a second device operated by an entity of the computing device. The entity may be an agent (e.g., such as a customer service representative, manager, etc.) of the computing device, an automated service (e.g., such as a software bot, etc.), a process executed by the computing device, or the like. The computing device may include one or more components of a dynamic-action system such as dynamic action system 200, dynamic-action system 300, etc.).

The computing device may generate the feature vector by extracting features from the data stream and representing the features according to a particular domain such as time. In some instances, the features may be extracted from the raw data stream. In other instances, the data stream may first be processed to generate a processed data stream. The features may be extracted from the processed data stream. Processing the data stream may include converting the data stream into an alternate domain (e.g., such as a frequency domain) using one or more functions (e.g., such as a Fourier function, etc.), removing noise, amplifying frequency ranges, etc.

At block 608, the computing device may execute a set of machine-learning models using the feature vector. The set of machine-learning models may be configured to generate a set of characteristics associated with the data stream. For example, the set of machine-learning models may include machine-learning models configured to generate signals that characterize the data of the data stream. The machine-learning models may generate any of the signals previously described in connection with FIG. 2 and FIG. 3. For example, the machine-learning models may include a machine-learning model configured to generate a meaningful automation communication score (MACS) characteristic that indicates how well an automated service is communicating with the first device operated by the user. The MACS characteristic may be used to determine if the user of the first device is receiving and/or transmitting expected data over the data stream to the automated service.

At block 612, the computing device may determine that a condition of at least one trigger of a set of triggers is satisfied based on the set of characteristics. A trigger may include one or more conditions and an executable event (e.g., such as a function, FAAS, remote procedure call, etc.), that executes when the one or more conditions are satisfied. The executable event may include any executable event as previously described in connection with FIG. 2 and FIG. 3. The executable events may adjust the course of the data stream to achieve a particular result by transmitting data over the data stream, connecting or disconnecting devices connected to the data stream, etc. Returning to the previous example, a trigger may include a condition that is satisfied upon a MACS characteristic being less than a threshold (e.g., indicating an issue in the performance of the automated service or the conversation with the automated service, etc.). The trigger may then cause its corresponding executable event to execute, causing the automated service to disconnect from the data stream and a new device operated by an agent to be connected to the data stream.

At block 616, the computing device may execute, in response to determining that the condition of the at least one trigger is satisfied, a function associated with the at least one trigger (e.g., the function of the executable event of the trigger). The function may be configured to modify data that is to be transmitted over the data stream by, for example, selecting data to be transmitted over the data stream, selecting a new device to connect to the data stream that will transmit data over the data stream. selecting a new automated service to connect to the data stream that will transmit data over the data stream, providing a suggestion to the second device of data that should be transmitted over the data stream, combinations thereof, or the like.

At block 620, the computing device may modify, using a machine-learning model, the set of triggers based on the set of characteristics and the data stream to increase at least one characteristic of the set of characteristics. An effect of the modification to the data stream caused by the trigger may be detected by the characteristics output from the set of machine-learning models. Based on the effect (e.g., changes in one or more characteristics of the set of characteristics), the computing device may define one or more modifications to the triggers. The modifications to the triggers may be configured to cause a change in one or more of the set of characteristics. For example, a target value may be defined for each of one or more characteristics. The modification of the triggers may be configured to cause the values of the one or more characteristics to be closer to the target values. The modifications to the triggers can include, but is not limited to, modifying the conditions of the trigger (e.g., such that the conditions of the trigger are more likely or less likely to be satisfied, are likely to be satisfied more frequently or less frequently, etc.), modifying the executable event, disabling the trigger, activating the trigger, combinations thereof, or the like.

In some instances, the computing device may use a machine-learning model trained to define modifications to the triggers. The machine-learning model may receive a feature vector that includes a current set of characteristics, target values for one or more characteristics of the set of characteristics, an identification of the set of triggers (e.g., including an identification of the conditions associated with each trigger and the executable event), information associated with the first device and/or a user thereof (e.g., such as based on historical data streams involving the first device or the user, demographic information, etc.), combinations thereof, and the like. The machine-learning model may output an identification of a modification to be performed on one or more triggers of the set of triggers. Alternatively, or additionally, the machine-learning model may automatically implement the modification to the one or more triggers. The machine-learning model may execute repeatedly during the data stream refining the set of triggers to cause the set of characteristics to be adjusted closer or equal the target values.

Figure 7:
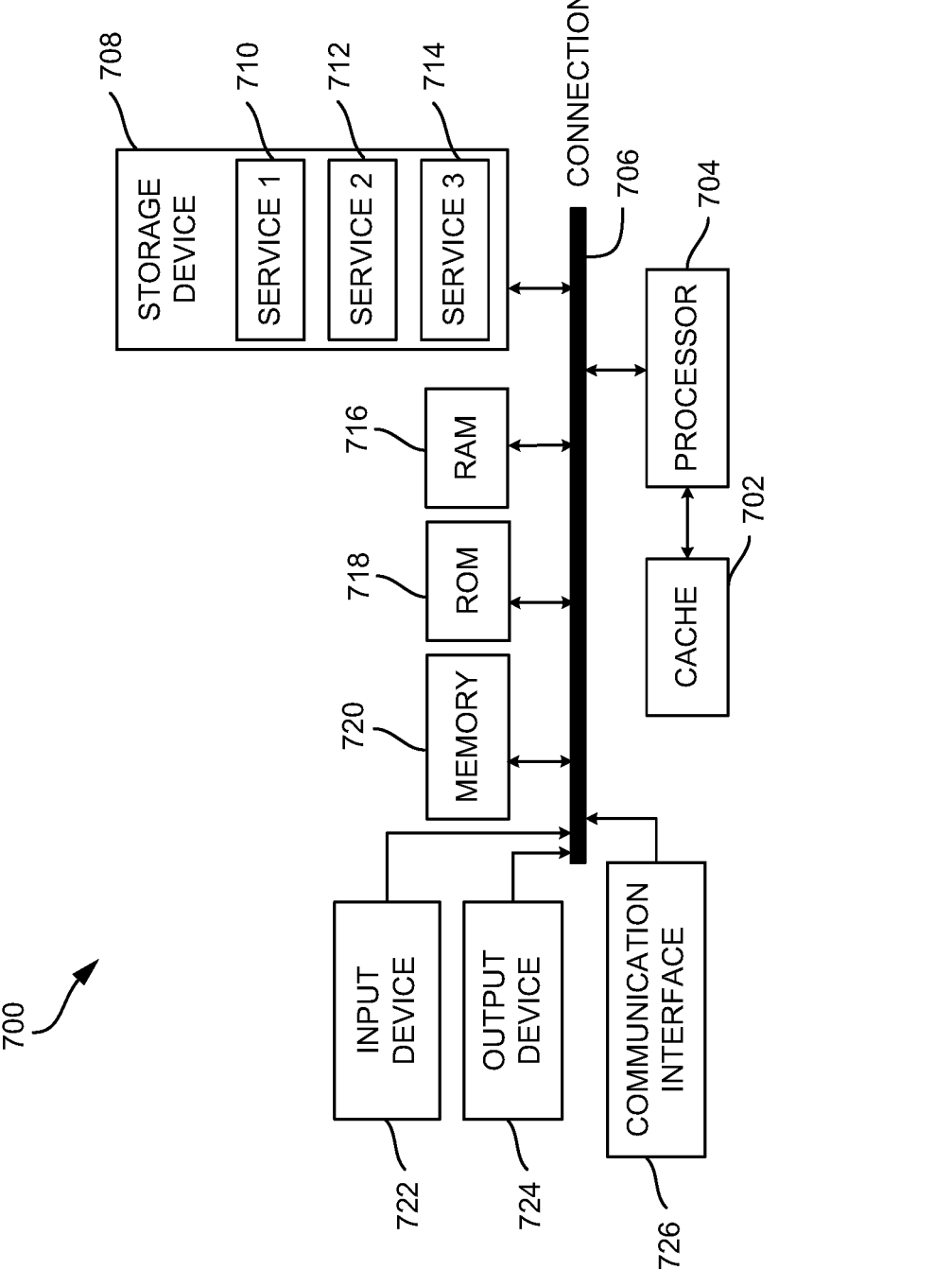
FIG. 7 illustrates an example computing device architecture of an example computing device that can implement the various techniques described herein according to aspects of the present disclosure.

FIG. 7 illustrates an example computing device according to aspects of the present disclosure. For example, computing device 700 can implement any of the systems or methods described herein. In some instances, computing device 700 may be a component of or included within a media device. The components of computing device 700 are shown in electrical communication with each other using connection 706, such as a bus. The example computing device architecture 700 includes a processor (e.g., CPU, processor, or the like) 704 and connection 706 (e.g., such as a bus, or the like) that is configured to couple components of computing device 700 such as, but not limited to, memory 720, read only memory (ROM) 718, random access memory (RAM) 716, and/or storage device 708, to processing unit 710.

Computing device 700 can include a cache 702 of high-speed memory connected directly with, in close proximity to, or integrated within processor 704. Computing device 700 can copy data from memory 720 and/or storage device 708 to cache 702 for quicker access by processor 704. In this way, cache 702 may provide a performance boost that avoids delays while processor 704 waits for data. Alternatively, processor 704 may access data directly from memory 720, ROM 717, RAM 716, and/or storage device 708. Memory 720 can include multiple types of homogenous or heterogeneous memory (e.g., such as, but not limited to, magnetic, optical, solid-state, etc.).

Storage device 708 may include one or more non-transitory computer-readable media such as volatile and/or non-volatile memories. A non-transitory computer-readable medium can store instructions and/or data accessible by computing device 700. Non-transitory computer-readable media can include, but is not limited to magnetic cassettes, hard-disk drives (HDD), flash memory, solid state memory devices, digital versatile disks, cartridges, compact discs, random access memories (RAMs) 725, read only memory (ROM) 720, combinations thereof, or the like.

Storage device 708, may store one or more services, such as service 1 710, service 2 712, and service 3 714, that are executable by processor 704 and/or other electronic hardware. The one or more services include instructions executable by processor 704 to: perform operations such as any of the techniques, steps, processes, blocks, and/or operations described herein; control the operations of a device in communication with computing device 700; control the operations of processing unit 710 and/or any special-purpose processors; combinations therefor; or the like. Processor 704 may be a system on a chip (SOC) that includes one or more cores or processors, a bus, memories, clock, memory controller, cache, other processor components, and/or the like. A multi-core processor may be symmetric or asymmetric.

Computing device 700 may include one or more input devices 722 that may represent any number of input mechanisms, such as a microphone, a touch-sensitive screen for graphical input, keyboard, mouse, motion input, speech, media devices, sensors, combinations thereof, or the like. Computing device 700 may include one or more output devices 724 that output data to a user. Such output devices 724 may include, but are not limited to, a media device, projector, television, speakers, combinations thereof, or the like. In some instances, multimodal computing devices can enable a user to provide multiple types of input to communicate with computing device 700. Communications interface 726 may be configured to manage user input and computing device output. Communications interface 726 may also be configured to managing communications with remote devices (e.g., establishing connection, receiving/transmitting communications, etc.) over one or more communication protocols and/or over one or more communication media (e.g., wired, wireless, etc.).

Computing device 700 is not limited to the components as shown if FIG. 7. Computing device 700 may include other components not shown and/or components shown may be omitted.

The following examples are example aspects of the present disclosure. Any reference to a series of examples is to be understood as a reference to each of those examples disjunctively (e.g., "Examples 1-4" is to be understood as "Examples 1, 2, 3, or 4").

Example 1 is a method comprising: generating, from a data stream, a feature vector representative of data of the data stream over a time interval; executing a set of machine-learning models using the feature vector, the set of machine-learning models configured to generate a set of characteristics associated with the data stream; determining that a condition of at least one trigger of a set of triggers is satisfied based on the set of characteristics; executing, in response to determining that the condition of the at least one trigger is satisfied, a function associated with the at least one trigger, the function being configured to modify data that is to be transmitted over the data stream; and modifying, by a trigger machine-learning model, the set of triggers based on the set of characteristics and the data stream to increase at least one characteristic of the set of characteristics.

Example 2 is the method of any of example(s) 1 and 3-10, wherein the data stream includes a voice connection with an automated service, the automated service providing a portion of the data of the data stream.

Example 3 is the method of any of example(s) 1-2 and 4-10, wherein the at least one characteristic corresponds to an evaluation of an automated service.

Example 4 is the method of any of example(s) 1-3 and 5-10, further comprising: executing, in response to modifying the set of triggers, the set of machine-learning models to generate a new set of characteristics from the data stream; determining that a condition of a particular trigger is satisfied based on the new set of characteristics; executing, in response to determining that the condition of the particular trigger is satisfied, a particular function associated with the particular trigger; and modifying, by the machine-learning model, the set of triggers based on the new set of characteristics and the data stream.

Example 5 is the method of any of example(s) 1-4 and 6-10, wherein modifying the set of triggers includes modifying one or more conditions of a corresponding one or more triggers.

Example 6 is the method of any of example(s) 1-5 and 7-10, wherein modifying the set of triggers includes adding one or more new triggers.

Example 7 is the method of any of example(s) 1-6 and 8-10, wherein modifying the set of triggers includes removing one or more triggers.

Example 8 is the method of any of example(s) 1-7 and 9-10, further comprising: receiving, via an interface, input defining a new trigger, the input including an identification of the new trigger, an indication of a condition, and a function configured to execute when a condition of the new trigger is satisfied.

Example 9 is the method of any of example(s) 1-8 and 10, wherein executing the function causes the data stream to connect from a first automated service to a second automated service.

Example 10 is the method of any of example(s) 1-9, wherein executing the function the data stream to connect from an automated service to a device.

Example 11 is a system comprising: one or more processors; and a non-transitory machine-readable storage medium storing instructions that when executed by the one or more processors, cause the one or more processors to perform the methods of any of example(s) 1-10.

Example 12 is a non-transitory machine-readable storage medium storing instructions that when executed by one or more processors, cause the one or more processors to perform the methods of any of example(s) 1-10.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored in a form that excludes carrier waves and/or electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Some portions of this description describe examples in terms of algorithms and symbolic representations of operations on information. These operations, while described functionally, computationally, or logically, may be implemented by computer programs or equivalent electrical circuits, microcode, or the like. Furthermore, arrangements of operations may be referred to as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module can be implemented with a computer-readable medium storing computer program code, which can be executed by a processor for performing any or all of the steps, operations, or processes described.

Some examples may relate to an apparatus or system for performing any or all of the steps, operations, or processes described. The apparatus or system may be specially constructed for the required purposes, and/or it may comprise a general-purpose computing device selectively activated or reconfigured by a computer program stored in memory of computing device. The memory may be or include a non-transitory, tangible computer readable storage medium, or any type of media suitable for storing electronic instructions, which may be coupled to a bus. Furthermore, any computing systems referred to in the specification may include a single processor or multiple processors.

While the present subject matter has been described in detail with respect to specific examples, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual examples may be described herein as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method comprising:

generating a feature vector from communications of a real-time data stream, wherein the real-time data stream is a representation of a communication session between a user of a first device and a service of a second device, wherein the communications include natural language communications provided by the user;

executing a first machine-learning model using the feature vector, wherein of first machine-learning model is configured to generate a conversation score, wherein the conversation score indicates a quality of natural language communications between the user and the service;

determining that a condition of a trigger of a set of triggers is satisfied based on the conversation score being below a threshold, wherein the conversation score being below the threshold indicates poor quality natural language communications between the user and the service;

facilitating a connection of a third device to the communication session in response to executing a function associated with the trigger, wherein a user of the third device communicates with the user of the first device using natural language communications;

generating a training vector for a second machine-learning model using natural language communications of the real-time data stream that occur after execution of the first machine-learning model, wherein the second machine-learning model is trained using supplemental training data, and wherein the training vector is configured to replace at least a portion of the supplemental training data to improve an accuracy of the second machine-learning model with respect to the communication session;

updating the second machine-learning model using the training vector, wherein the second machine-learning model is configured to manage the set of triggers; and modifying, using the second machine-learning model, one or more triggers of the set of triggers based on the conversation score and the real-time data stream, wherein the one or more triggers are modified in response to executing the function associated with the trigger, and wherein modifying the one or more triggers reduces a probability that a condition of the one or more triggers will be satisfied during a subsequent time interval of the communication session.

2. The method of claim 1, wherein the service is an automated service that is configured to communicate with the user over the real-time data stream using natural language communications.

3. The method of claim 1, wherein the machine-learning model is further configured to generate a predicted intent of the user of the first device.

4. The method of claim 1, further comprising:

executing, in response to modifying the set of triggers, the machine-learning model to generate a new conversation score;

determining that a condition of a particular trigger is satisfied based on the new conversation score;

executing, in response to determining that the condition of the particular trigger is satisfied, a particular function associated with the particular trigger; and modifying the set of triggers based on the conversation score and the real-time data stream.

5. The method of claim 1, wherein modifying the set of triggers includes modifying one or more conditions of a corresponding one or more triggers.

6. The method of claim 1, wherein modifying the set of triggers includes adding one or more new triggers or removing one or more triggers.

7. The method of claim 1, wherein executing the function causes the real-time data stream to connect a second service to the real-time data stream.

8. A system comprising:

one or more processors; and a non-transitory machine-readable storage medium storing instructions that when executed by the one or more processors, cause the one or more processors to perform operations including:

generating a feature vector from communications of a real-time data stream, wherein the real-time data stream is a representation of a communication session between a user of a first device and a service of a second device, wherein the communications include natural language communications provided by the user;

executing a first machine-learning model using the feature vector, wherein of first machine-learning model is configured to generate a conversation score, wherein the conversation score indicates a quality of natural language communications between the user and the service;

determining that a condition of a trigger of a set of triggers is satisfied based on the conversation score being below a threshold, wherein the conversation score being below the threshold indicates poor quality natural language communications between the user and the service;

facilitating a connection of a third device to the communication session in response to executing a function associated with the trigger, wherein a user of the third device communicates with the user of the first device using natural language communications;

generating a training vector for a second machine-learning model using natural language communications of the real-time data stream that occur after execution of the first machine-learning model, wherein the second machine-learning model is trained using supplemental training data, and wherein the training vector is configured to replace at least a portion of the supplemental training data to improve an accuracy of the second machine-learning model with respect to the communication session;

updating the second machine-learning model using the training vector, wherein the second machine-learning model is configured to manage the set of triggers; and modifying, using the second machine-learning model, one or more triggers of the set of triggers based on the conversation score and the real-time data stream, wherein the one or more triggers are modified in response to executing the function associated with the trigger, and wherein modifying the one or more triggers reduces a probability that a condition of the one or more triggers will be satisfied during a subsequent time interval of the communication session.

9. The system of claim 8, wherein the service is an automated service that is configured to communicate with the user over the real-time data stream using natural language communications.

10. The system of claim 8, wherein the machine-learning model is further configured to generate a predicted intent of the user of the first device.

11. The system of claim 8, wherein the operations further include:

executing, in response to modifying the set of triggers, the machine-learning model to generate a new conversation score;

determining that a condition of a particular trigger is satisfied based on the new conversation score;

executing, in response to determining that the condition of the particular trigger is satisfied, a particular function associated with the particular trigger; and modifying the set of triggers based on the conversation and the real-time data stream.

12. The system of claim 8, wherein modifying the set of triggers includes modifying one or more conditions of a corresponding one or more triggers.

13. The system of claim 8, wherein modifying the set of triggers includes adding one or more new triggers or removing one or more triggers.

14. The system of claim 8, wherein executing the function causes the real-time data stream to connect a second service to the real-time data stream.

15. A non-transitory machine-readable storage medium storing instructions that when executed by one or more processors, cause the one or more processors to perform operations including:

generating a feature vector from communications of a real-time data stream, wherein the real-time data stream is a representation of a communication session between a user of a first device and a service of a second device, wherein the communications include natural language communications provided by the user;

executing a first machine-learning model using the feature vector, wherein of first machine-learning model is configured to generate a conversation score, wherein the conversation score indicates a quality of natural language communications between the user and the service;

determining that a condition of a trigger of a set of triggers is satisfied based on the conversation score being below a threshold, wherein the conversation score being below the threshold indicates poor quality natural language communications between the user and the service;

facilitating a connection of a third device to the communication session in response to executing a function associated with the trigger, wherein a user of the third device communicates with the user of the first device using natural language communications;

generating a training vector for a second machine-learning model using natural language communications of the real-time data stream that occur after execution of the first machine-learning model, wherein the second machine-learning model is trained using supplemental training data, and wherein the training vector is configured to replace at least a portion of the supplemental training data to improve an accuracy of the second machine-learning model with respect to the communication session;

updating the second machine-learning model using the training vector, wherein the second machine-learning model is configured to manage the set of triggers; and modifying, using the second machine-learning model, one or more triggers of the set of triggers based on the conversation score and the real-time data stream, wherein the one or more triggers are modified in response to executing the function associated with the trigger, and wherein modifying the one or more triggers reduces a probability that a condition of the one or more triggers will be satisfied during a subsequent time interval of the communication session.

16. The non-transitory machine-readable storage medium of claim 15, wherein the service is an automated service that is configured to communicate with the user over the real-time data stream using natural language communications.

17. The non-transitory machine-readable storage medium of claim 15, wherein the machine-learning model is further configured to generate a predicted intent of the user of the first device.

18. The non-transitory machine-readable storage medium of claim 15, wherein the operations further include:

executing, in response to modifying the set of triggers, the machine-learning model to generate a new conversation score;

determining that a condition of a particular trigger is satisfied based on the new conversation score;

executing, in response to determining that the condition of the particular trigger is satisfied, a particular function associated with the particular trigger; and modifying the set of triggers based on the conversation score and the real-time data stream.

19. The non-transitory machine-readable storage medium of claim 15, wherein modifying the set of triggers includes modifying one or more conditions of a corresponding one or more triggers.

20. The non-transitory machine-readable storage medium of claim 15, wherein modifying the set of triggers includes adding one or more new triggers or removing one or more triggers.

* * * * *